US012810896B2

(12) United States Patent
Salta et al.

(10) Patent No.: US 12,810,896 B2
(45) Date of Patent: Nov. 24, 2026

(54) AUDIO EDITING SYSTEM AND APPLICATION

(71) Applicants: Thomas P. Salta, Norwalk, CT (US); David Molnar, London (GB)

(72) Inventors: Thomas P. Salta, Norwalk, CT (US); David Molnar, London (GB)

( * ) Notice: Subject to any disclaimer, the term of this patent is extended or adjusted under 35 U.S.C. 154(b) by 293 days.

(21) Appl. No.: 18/536,921

(22) Filed: Dec. 12, 2023

(65) Prior Publication Data

US 2024/0194224 A1 Jun. 13, 2024

Related U.S. Application Data

(60) Provisional application No. 63/386,998, filed on Dec. 12, 2022.

(51) Int. Cl.
*G11B 27/028* (2006.01)
*G11B 27/029* (2006.01)
*G11B 27/031* (2006.01)

(52) U.S. Cl.
CPC .......... *G11B 27/028* (2013.01); *G11B 27/031* (2013.01); *G11B 27/029* (2013.01)

(58) Field of Classification Search
USPC .......................................................... 700/94
See application file for complete search history.

(56) References Cited

U.S. PATENT DOCUMENTS 8,907,195 B1 12/2014 Erol
11,029,915 B1 * 6/2021 Vercellotti .............. G06F 3/165
2007/0190929 A1 * 8/2007 Sato ........................ G11B 27/34 455/3.06
2008/0226086 A1 * 9/2008 Kageyama ............. H04H 60/04 381/119
2012/0290625 A1 11/2012 Gies
2013/0294606 A1 11/2013 Soroka et al.
2015/0271621 A1 9/2015 Sen et al.
(Continued)

OTHER PUBLICATIONS

"Bounce Factory 1: Basic Snapshots," uploaded on Mar. 28, 2022 by user "@andrewscheps6714". Retrieved from Internet: <https://www.youtube.com/watch?v=gGgZPZlq_Iw> (Year: 2022).*
(Continued)

*Primary Examiner* — Fan S Tsang
*Assistant Examiner* — Sean Rinehart
(74) *Attorney, Agent, or Firm* — Whitmyer IP Group LLC

(57) ABSTRACT

An audio editing system includes a controller for processing audio data; an interface establishing communication between the processor and a digital audio workstation (DAW), the DAW having an audio production program executing thereon and at least one audio project stored therein; a scanner controlled by the controller to analyze the project to obtain a list of all tracks corresponding to the project; and an automated bouncing module receiving a job list which includes multiple jobs, each job indicating a selection of the tracks and a cycle range to bounce into at least one set of stem files, at least one mix file, or at least one set of stem files and at least one mix file. The automated bouncing module transmits bounce commands to the audio production program to automatically bounce the respective selection of the tracks for each job consecutively in a single run.

20 Claims, 12 Drawing Sheets

(56) References Cited

U.S. PATENT DOCUMENTS

2018/0308518 A1* 10/2018 Leonard .................. H03G 3/02

OTHER PUBLICATIONS

"Bounce Factory 2: Advanced Snapshots," uploaded on Mar. 28, 2022 by user "@andrewscheps6714". Retrieved from Internet: <https://www.youtube.com/watch?v=XC7InJ7Gmh0>. (Year: 2022).*

"Bounce Factory 5: Bouncing Mixes!," uploaded on Mar. 28, 2022 by user "@andrewscheps6714". Retrieved from Internet: <https://www.youtube.com/watch?v=KUKWgDHVnMA>. (Year: 2022).*

"Bounce Factory 4: Getting Ready to Bounce," uploaded on Mar. 28, 2022 by user "@andrewscheps6714". Retrieved from Internet: < https://www.youtube.com/watch?v=ITRaR1RxS6E>. (Year: 2022).*

"Using Andrew Scheps Bounce Factory for Audio Post Production," uploaded on Apr. 8, 2022 by user "@Production Expert". Retrieved from Internet: <https://www.youtube.com/watch?v=2h8sf8CvXHA> (Year: 2022).*

"How to Use Bounce Butler with Logic Pro X," uploaded on Jan. 4, 2021 by user "@_TheModernCreative". Retrieved from Internet: <https://www.youtube.com/watch?v=7fBH3mkwWkw> (Year: 2021).*

"Logic Tips—Bounce in Place," uploaded on Aug. 28, 2020 by user "@MusicTechOfficial". Retrieved from Internet: <https://www.youtube.com/watch?v=ufQiyDocGTM> (Year: 2020).*

"How to Export Stems in Logic Pro X—Exporting Stems in Logic X," uploaded on Jun. 7, 2018 by user "@Unders". Retrieved from Internet: <https://www.youtube.com/watch?v=wfzhOGSiSOI> (Year: 2018).*

"What is the best script to use to wait for the Bounce to Mix window to close and then continue?," posted Nov. 22, 2020 by user "John_Costello." Retrieved from internet: <https://forum.soundflow.org/-3486/what-is-the-best-script-to-use-to-wait-for-the-bounce-to-mix-window-to-close-and-then-continue> (Year: 2020).*

International Search Report and Written Opinion of the International Searching Authority: Application No. PCT/US2024/055494; Completed: Dec. 17, 2024; Mailing Date: Jan. 16, 2025; 12 Pages.

* cited by examiner

AUDIO EDITING SYSTEM AND APPLICATION

TECHNICAL FIELD

The present invention relates to a system for processing and compiling portions of video and/or audio tracks. More specifically, the present invention relates to an audio editing system, method, computer software, and companion application that automates bouncing different portions of video and/or audio tracks based on user input.

BACKGROUND

The term "bouncing" is well known in the field of audio engineering and comes from the analog era when track count was a hard limit on tape machines. Engineers and music producers would use their audio consoles to mix several tracks down to one to free up more recording. This process is called "bouncing."

Presently, in the digital and computer era, "bouncing" refers to the process of mixing tracks into a mix or a submix (e.g., a stem) and writing/recording it to one or more stereo audio files. Bouncing tracks is the process of bouncing a completed song into one or more audio files. More specifically, bouncing audio is about exporting a finished track into smaller audio groups. For example, the bass is one group, the vocals are another group, the instruments are a third group, and the drums are a fourth group. Another group may include sound effects. These audio groups are called stem files. Stems are thus stereo recordings/audio files derived from a larger mix of multiple tracks. The drum stem, for example, includes all of the drums, an instrument stem includes all of the instruments, and the vocal stem includes all of the vocals.

Bouncing tracks also refers to bouncing all of the stem files down to just one audio file too, which in essence is the whole track. Thus, bouncing audio is about bouncing a whole song/audio project down into audio groups, and then again into the final audio file.

Note, it is well known in the art that there is a difference between bouncing audio and simply exporting audio. Bouncing audio is the process of exporting a complete song/audio project (from a digital audio workstation, DAW) to a single stereo audio file or a plurality of stereo audio files, which are the stem files (e.g., MP3, AIFF, WAV, M4A). Bouncing may also allow the audio to be run (processed) through the entire signal chain so it has processing and effects. On the other hand, simply "exporting" audio refers only to exporting individual audio, like a one-shot or a singular melody line, to an audio file. Also, simply exporting audio generally results in "raw", unaltered content.

There are several reasons why bouncing is performed. First, it saves computer processing power. Also, transmitting audio files over a network, such as the Internet, is easier and quicker with respect to upload and download speeds than sending a large DAW project file. In addition, bouncing can speed up workflow by enabling a user to print multiple formats of a single mix, such as creating WAV, AIFF, MP3, and even M4A files.

However, bouncing remains a monotonous and time-consuming task within conventional digital audio workstations and conventional audio production software. Running multiple stems, i.e., bouncing, requires time for setting up the DAW and configuring bounce parameters for each stem, as well as time waiting for the bouncing operation to complete before proceeding with the next stem. The entire process requires substantial time simply waiting around for each bounce iteration to complete, which ends up being a waste of time—or at least an ineffective use of time—for audio engineers, composers, producers, and songwriters.

Composers, producers, or songwriters commonly have to provide stems and mixes to an engineer, trailer house, music library, or client. These stems might be grouped into categories like Percussion, Vocals, Strings, Brass, Woodwinds, Pads, Arps, etc. Sometimes there is a need to run stems both "Wet" (with effects) and "Dry" (without effects). The need to create multiple mixes is also very common. Often, an un-mastered mix is required in addition to a mastered mix. All of this can become very time-consuming and exacerbate the issue with wasted time.

This issue can get even more challenging for composers in video games, often requiring multiple bar ranges to be run as separate mixes and separate sets of stems. This can quickly add up to a massive list of files and folders requiring many hours of monotonous and repetitive work for the composer, producer, assistant, etc.

Thus, there exists a need for an improved audio editing system, audio production system, digital audio workstation, audio editing application software, audio production software, and/or companion application (which links to an audio editing system, audio production system, or digital audio workstation) that achieves bouncing without significantly burdening the user while, at the same time, eliminating the need for complicated infrastructure implementations.

SUMMARY

The needs set forth herein as well as further and other needs and advantages are addressed by the present embodiments, which illustrate solutions and advantages described below.

It is an object of the present teachings to remedy the above drawbacks and shortcomings associated with known digital audio workstations and audio production and editing software.

It is an object of the present teachings to provide a digital audio workstation (DAW), an audio editing system, audio editing software, and/or companion application (which links to a DAW) that reduces the amount of user engagement and feedback during editing processes, including bouncing operations. Herein, the term "companion application" is intended to encompass a companion application, a plugin, an add-on, and an extension, as are known in the art.

It is another object of the present teachings to provide a DAW, an audio editing system, audio editing software, and/or companion application (which links to a DAW) that improves the efficiency in performing bouncing operations.

These and other objects of the present teachings are achieved by a DAW, an audio editing system, or companion application that runs alongside a DAW (e.g., Logic Pro) which automates the process of running stems, multi-tracks, and mixes. In particular, the present teachings provide an audio editing system which comprises a controller for processing audio data; an interface configured to establish communication between the processor and a digital audio workstation, the digital audio workstation having an audio production program executing thereon and at least one audio project stored therein; a scanner controlled by the controller to determine whether the audio project is loaded in the audio production program of the digital audio workstation; in response to a confirmation that the audio project is loaded, the scanner analyzes the audio project to obtain a list of all tracks corresponding to the audio project; and an automated bouncing module receiving a job list which includes multiple jobs, each job indicating a selection of said tracks and a cycle range to bounce into at least one set of stem files, at least one mix file, or at least one set of stem files and at least one mix file, wherein the automated bouncing module transmits bounce commands to the audio production program to automatically bounce the respective selection of said tracks for each job consecutively in a single run, and wherein the automated bouncing module automatically names each stem file and/or each mix file with distinct names according to a pre-defined naming convention.

In addition, the present teachings provide an audio editing companion application, which comprises a link interface registering the companion application with an audio production program of a digital audio workstation, the link interface establishing a hook into the audio production program; a scanner detecting an audio project which is loaded in the audio production program of the digital audio workstation, the scanner analyzing the audio project to obtain a list of all tracks corresponding to the audio project; and an automated bouncing module receiving a job list which includes multiple jobs, each job indicating a selection of said tracks and a cycle range to bounce into at least one set of stem files, at least one mix file, or at least one set of stem files and at least one mix file, wherein the automated bouncing module transmits bounce commands to the audio production program to automatically bounce the respective selection of said tracks for each job consecutively in a single run, and wherein the automated bouncing module automatically names each stem file and/or each mix file with distinct names according to a pre-defined naming convention. The audio editing companion application runs on the digital audio workstation.

The audio editing system and companion application according to the present teachings enable a user to choose whatever combination of tracks, folder stacks, and summing stacks, to bound as stems and mixes. They provide for selecting a range in the completed song/audio project to be bounced, muting auxiliary (AUX) channels for running "dry" stems/mixes (i.e., stems/mixes without any added effects, like reverb, EQ, etc.), and bypassing any FX plugin on the Master Out channel. With the audio editing system and the companion application according to the present teachings, complete sets of stems can be bounced with fewer user inputs, multiple "jobs" (mixes and/or sets of stems) can be bounced with different cycle ranges and bounce parameters, and further wet and dry stems and/or mixes can be bounced sequentially. The audio editing system and the companion application enable bouncing stems and mixes with or without various Master Out insert effects applied and creating custom and dynamic naming conventions for the stems and mixed. This results in more efficient bouncing operations and minimal wasted time by the user. The present teachings also cover an audio production system, audio production software, and/or audio editing software that automatically processes, compiles, and exports stems and mixes according to user preferences.

The audio editing system and companion application according to the present teachings and described herein are known by the product name "Auto-Bounce."

It is to be understood that the terminology used herein is for the purpose of describing particular embodiments only, and is not intended to be limiting, since the scope of the present invention will be limited only by the appended claims. Unless otherwise defined, all technical terms used herein have the same meaning as commonly understood by one of ordinary skill in the art to which this technology belongs.

For the purposes of the disclosure herein, regarding the term "job," a single job can be either a single Audio Mix or a set of multiple tracks or stems. Each job comprises a selection of tracks (for either stem or mix exporting) and a specific start/end range. The key feature of the audio editing system or application of the present teachings (Auto-Bounce) is that it can run multiple jobs in a single pass. Everything listed in a Jobs List will be run when the bounce operation is initiated.

The term "track," in conventional digital audio workstations (like Logic Pro), can be a MIDI or Audio track. In the audio editing system or application of the present teachings, tracks are individually selectable for exporting as individual audio files (Stem Mode) or combined into a single audio file (Mix Mode). In addition to tracks, there are track-stacks or folders, which are groupings of tracks.

The term "stem," in the professional audio engineering field, is usually defined as a grouping of multiple tracks that are combined, mixed, and exported ("bounced") as a single audio file. In the audio editing system or companion application of the present teachings, an input module is configured to receive user input in the form of a selection of "Stem" within the user interface of the audio editing system or application, for example by checking a box next to a Track Stack (folder or summing stack). In the audio editing system or application of the present teachings, a Track Stack is identifiable because there is a dropdown arrow next to the track select checkbox and a folder icon next to the track number.

The term "controller" means any device, system, or part thereof that controls at least one operation. Such a controller may be implemented in hardware or a combination of hardware and software and/or firmware. The functionality associated with any particular controller may be centralized or distributed, whether locally or remotely.

Various functions described below can be implemented or supported by one or more computer programs, each of which is formed from computer readable program code and embodied in a non-transitory computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of non-transitory medium capable of being accessed by a computer, such as read only memory (ROM), random access memory (RAM), a hard disk drive, a compact disc (CD), a digital video disc (DVD), or any other type of memory. A non-transitory computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Other features and aspects of the present teachings will become apparent from the following detailed description, taken in conjunction with the accompanying drawings, which illustrate by way of example the features in accordance with embodiments of the present teachings. The summary is not intended to limit the scope of the present teachings.

DETAILED DESCRIPTION

The present teachings are described more fully hereinafter with reference to the accompanying drawings, in which the present embodiments are shown. The following description is presented for illustrative purposes only, and the present teachings should not be limited to these embodiments.

The present teachings have been described in language more or less specific as to structural, mechanical, and functional features. It is to be understood, however, that the present teachings are not limited to the specific features shown and described, since the apparatus, system, method, an/or application herein disclosed comprises preferred forms of putting the present teachings into effect.

For purposes of explanation and not limitation, specific details are set forth such as particular structures, architectures, interfaces, techniques, etc. in order to provide a thorough understanding. In other instances, detailed descriptions of well-known devices and/or methods are omitted so as not to obscure the description with unnecessary detail.

Generally, all terms used in the claims are to be interpreted according to their ordinary meaning in the technical field, unless explicitly defined otherwise herein. All references to a/an/the element, apparatus, component, means, step, etc. are to be interpreted openly as referring to at least one instance of the element, apparatus, component, means, step, etc., unless explicitly stated otherwise. The use of "first", "second," etc. for different features/components of the present disclosure are only intended to distinguish the features/components from other similar features/components and not to impart any order or hierarchy to the features/components, unless explicitly stated otherwise. The phrase "at least one of," when used with a list of items, means that different combinations of one or more of the listed items may be used, and only one item in the list may be needed. For example, "at least one of: A, B, and C" includes any of the following combinations: A; B; C; A and B; A and C; B and C; and A and B and C.

Figure 1:
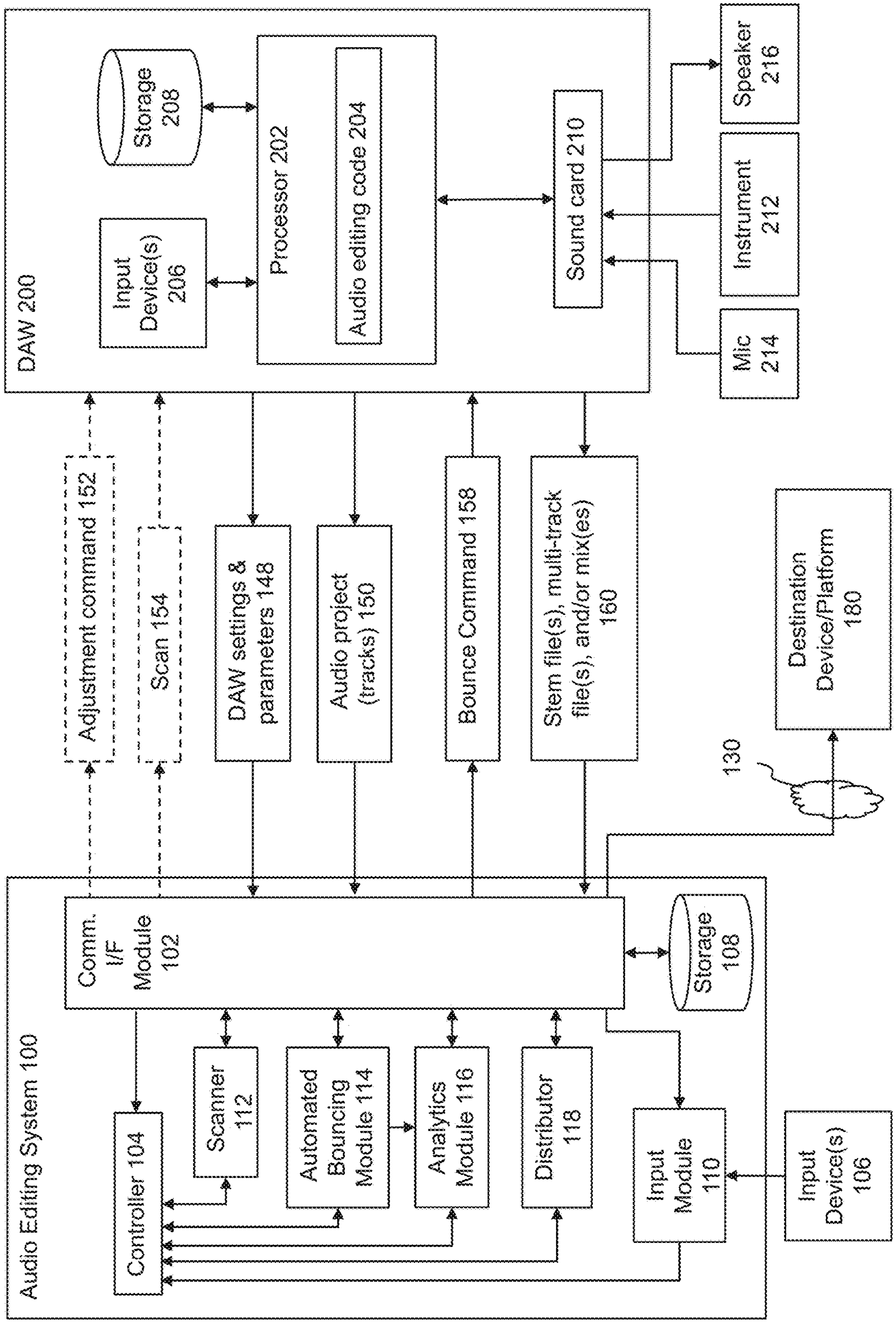
FIG. 1 is a schematic diagram of an audio editing system according to the present teachings.

Referring to FIG. 1, an audio editing system 100 (called Auto-Bounce) is designed to complement or function with a digital audio workstation 200, such as Logic Pro. The DAW 200 is a conventional DAW (e.g., Logic Pro) and thus fails to provide automated bouncing operations for multiple jobs in a single pass, as described in the Background section. The audio editing system 100 resolves this drawback. The DAW 200 comprises an electronic device and/or application software used for recording, editing, and producing song and audio projects, as is well known in the art. The DAW 200 may be embodied as a computer comprising a processor 202 executing audio production and editing program code 204, a sound card(s) or audio interface(s) 210 (e.g., MIDI), at least one user input device 206 for adding or modifying data, and a non-transitory computer readable storage medium 208 (e.g., hard disk drive, external cloud storage, server, etc.) for saving song/audio project files and data. The production and editing program code 204 includes bounce capabilities, but such capabilities are limited to running a single operation to bounce a single stem file or a single mix file. The at least one input device 206 may be a computer keyboard, mouse, or trackpad. One or more musical instruments 212, microphone(s) 214, and speaker(s) 216 may be connected to the DAW 200 through the sound card/audio interface 210. The computer acts as a host for the sound card 210, while the program code 204 provides the interface and functionality for audio production and editing. The DAW 200 may be configured to enable MIDI controls to tune parameters during live editing.

In some embodiments, the DAW 200 supports plugins, which are smaller pieces of software with unique functionality, thereby expanding the capabilities of the DAW. The plugins are self-contained pieces of code that can be "plugged in" to the DAW to enhance its functionality. Plugins usually fall into the categories of audio signal processing, analysis, or sound synthesis. Typical plugins include equalization, dynamic range control, reverberation, delay, and virtual instruments.

In other embodiments, the DAW 200 may be an integrated stand-alone processing unit or a complex configuration of several hardware components controlled by a central computer or processor.

The audio editing system 100 (Auto-Bounce) includes a communications interface module 102 configured to provide bidirectional communication (transmit and receive) with the DAW 200. The communications interface module 102 may comprise an application programming interface (API) which enables the audio editing system 100 and the DAW 200 to talk to each other and extract and share data with each other in a secure and standardized way. In addition to the API or alternatively, the communications interface module 102 may comprise at least one of a serial data bus, a parallel data bus, inter-integrated circuit (I2C) bus, serial peripheral interface, PCI express, universal serial bus (USB), and other similar physical interface connectors. The audio editing system 100 and the DAW 200 are connected to each via a wired cable medium (e.g., ethernet cable, coax cable, optical fiber). In other embodiments, the communications interface module 102 may comprise a transmit antenna and a receive antenna, or a transceiver antenna, to provide wireless communication between the audio editing system 100 and the DAW 200, for example via WiFi, Bluetooth, cellular, or another wireless data communications platform as is well known in the art. The communications interface module 102 serves as the component by which the audio editing system 100 retrieves audio data from the DAW 200 and interacts with the DAW 200. The audio data includes but is not limited to song/audio project data, track data, and settings and parameters data. The audio editing system 100, for example, may be configured to manipulate certain aspects, settings, and/or parameters of the DAW 200 to ultimately perform automated bouncing operations. In some embodiments, the audio editing system 100 may control the functions of the DAW 200.

As shown in FIG. 1, the audio editing system 100 includes a controller 104, which may be a microprocessor or a multi-core processor. The controller 104 may be implemented on a single integrated circuit chip or may be constructed using a plurality of individual transistors or a plurality of integrated circuits. The audio editing system 100 also includes an input module 110, a scanner 112, and automated bouncing module 114, which together provide automatic bouncing of complete sets of stems with minimal user instruction, involvement, and interaction. The controller 104 controls the input module 110, scanner 112, and automated bouncing module 114 and may initialize and initiate the auto-bouncing operations to be performed by the automated bouncing module 114 using the bounce technology of the DAW 200. The input module 110 receives user input data from one or more input devices 106, such as a keyboard, mouse, trackpad, or even a mobile device (e.g., smart phone, smart watch). In other embodiments (not shown in FIG. 1), the input module 110 is connected to the at least one input device 206 and thus receives user input from the same input device(s) that are associated with the DAW 200. In other words, the input device(s) 106 and the input device(s) 206 are the same device(s) through which the user is able to access and use both the audio editing system 100 and the DAW 200.

In some embodiments, the scanner 112 and automated bouncing module 114 may provide fully automated bouncing, without any need for user input, instruction, or feedback through the input module. In this arrangement, the input module 110 may be omitted from the audio editing system 100.

The scanner 112 is configured to scan the song/audio project currently loaded in the DAW 200 so as to retrieve the tracks (including any track-stacks and/or folders) that make up the song/audio project, as well as to obtain information related to the tracks, collectively designated by reference number 150 in FIG. 1. More specifically, the scanner 112 first checks whether there is an open song/audio project in the DAW 200 by sending an inquiry signal to the processor 202. In some embodiments, if the processor 202 responds to the inquiry signal with a negative answer, the scanner 112 then sends a notification (e.g., displaying a pop-up window on the monitor of the audio editing system 100 and/or playing a sound) to the user to open a project on the DAW 200. If the processor 202 responds to the inquiry signal with a positive answer, the scanner 112 checks the version of the DAW 200 (i.e., version of the audio production and editing software 204 running on the DAW) and detects which language the DAW 200 is set to. The scanner 112 provides a warning—with a pop-up notification and/or an audible sound—indicating that the DAW 200 is using a language unsupported by the audio editing system 100. Conversely, if a supported language (e.g., English) is being used by the DAW 200, the scanner 112 proceeds with further checks of the DAW setup. For example, the audio editing system 100 may be configured such that it provides auto-bouncing operations when the audio editing code 204 is the only primary application running on the DAW 200. In this regard, the scanner 112 checks to see if there are any application windows associated with programs other than the audio editing code 204 that may be open on the DAW 200. If so, the scanner 112 may issue a notification (e.g., displaying a pop-up window on the monitor of the audio editing system 100 and/or playing a sound) instructing the user to close all open windows that may conflict with auto-bouncing operations. The scanner 112 also verifies that all required Control Bar and Display buttons of the DAW 200 (more specifically, the Control Bar and Display buttons of the user interface generated by the audio editing code 204) are visible on the monitor(s). The Control Bar and Display buttons required by the audio editing system 100 are discussed in detail below. The scanner 112 further verifies that all required Track Header information is visible on the monitor(s) of the DAW 200 (i.e., displayed in the user interface generated by the audio editing code 204). Should the scanner 112 detect that some required Control Bar and Display buttons and/or Track Header information are hidden, the scanner 112 will provide a warning—with a pop-up notification and/or an audible sound—alerting the user to make necessary adjustments to the DAW 200.

In addition to conducting the initial checks, the scanner 112 identifies which tracks are hidden in the DAW 200 and makes all hidden tracks visible. The scanner 112 also identifies which tracks are set to "Off." Any "Track Stacks" that are collapsed are expanded by the scanner 112, which then imports the names and numbers of all tracks and track stacks from the DAW 200. The scanner 112 notes whether a track stack is collapsed or expanded in the DAW 200. Thereafter, the scanner 112 opens the Mixer Panel of the DAW 200, reads in the names of all AUX Channels, reads in the names of all Master Output Fader Insert FX, and identifies which AUX channels are currently muted in the DAW 200. Further, the scanner 112 opens the bounce window of the DAW 200, records all bounce parameters from the DAW 200, and identifies the current cycle range of the DAW 200. Note, a cycle range defines an area over a particular part of the song/audio project that is selected and that can be played repeatedly.

Once the scanner 112 has received the tracks (including any track-stacks and folders that are present in the song/audio project) and information related to the tracks 150, the scanner 112 is configured to organize the tracks, track-stacks, and folders by using a hierarchical tree structure, which is then displayable in a track view of the user interface of the audio editing system 100.

After the scan and checks performed by the scanner 112 are completed, the automated bouncing module 114 controls the audio editing code 204 of the DAW 200 by sending bounce commands 158 to bounce multiple jobs (mixes and/or sets of stems 160) with different cycle ranges, bounce parameters, etc. in a single run. Also, the automated bouncing module 114 may include the capacity to automatically bounce wet and dry stems and/or mixes sequentially in a single run without interruption. Further, the automated bouncing module 114 may be configured to bounce stems and mixes with or without various Master Out insert effects (gating, compressing, equalizing, reverb effects, etc.) applied at the Master Out bus. In some embodiments where the DAW 200 has multiple output buses available, the automated bouncing module 114 may send control signals to the DAW 200 to select which output bus that the auto-bouncing operations should be applied to. This configuration enables the automated bouncing module 114 to manipulate and control the bypass state of particular insert effects on the auto-bouncing output. That is, certain insert effects can be selectively applied in the auto-bouncing operations by adjusting the output bus of the DAW. Similarly, the automated bouncing module 114 is configured to initiate automated bouncing of stems and/or mixes with one or more (e.g., all) AUX channels muted, for example, to create a dry stem or a set of dry stems. The automated bouncing module 114 accordingly can adjust which plug-in(s) and effects, each associated with one of the AUX channels, should be applied to the track(s) or track-stack(s) and which should be bypassed during the auto-bouncing operations.

The automated bouncing module 114 creates custom and dynamic naming conventions for each stem and/or mix that is created during the bouncing process. Alternatively, or in combination with the automated bouncing module 114, the controller 104 may be in charge of performing the custom and dynamic naming conventions for each stem and/or mix. The automated bouncing module 114—and in turn the audio editing system 100—saves time and frustration that would be involved in manual bouncing with the DAW 200.

The automated bouncing module 114 provides a main window (FIG. 10) in the user interface of the audio editing system 100, through which various jobs and properties may be set for auto-bouncing operations. The automated bouncing module 114 is designed to automatically configure the Control Bar and Display Settings and automatically configure Track Header settings of the DAW 200. Each job will list the number of files to be exported. Within the Job List section of the main window, individual jobs can be turned on and off (disabled/enabled). The automated bouncing module 114 allows for selecting and deselecting multiple items in the track list. Further, a rescan of hidden tracks and tracks that are turned off in the DAW 200 can be performed without the need for a full rescan of all tracks.

Within the Job Settings section of the main window, the automated bouncing module 114 provides for setting Start and End points using Logic markers according to user input. The automated bouncing module 114 makes available the "Export to Movie" feature of the DAW 200 as a bounce option. That is, the automated bouncing module 114 may be configured to control the audio editing code 204 of the DAW 200 to create a movie(s) as well during bouncing operations. The automated bouncing module 114 provides for the user to automatically create a "click track" by turning all tracks off, turning on the metronome, and bouncing that as a separate audio file. The automated bouncing module 114 provides MIDI exporting options, which include the ability to create a note on the downbeat of the project so each MIDI file starts at the first bar (bar 1). The automated bouncing module 114 is configured to bounce stems, multi-tracks, and/or mixes 160 in a plurality of formats, such as Stereo, Mono, Surround, Atmos, DTS:X or any other available format. Automatic mono or multichannel detection, per bounce, is provided by the automated bouncing module 114. Also, through the main window of the audio editing system 100, bounce settings can be adjusted for multiple jobs. A unique location can be chosen to bounce each individual job. Job bounce locations are saved within a storage medium 108 (as described further below) as part of a job set file and can be loaded back in by accessing the job set file. The automated bouncing module 114 may apply a plugin delay compensation. In some embodiments, the audio editing system 100 includes a Send Only Mode, where each selected track is automatically set to "No Output," so the only signal passing to the Main Out is from the sends. This can be set to "all sends combined" or "each send individually." When set individually, the audio editing system 100 will turn each stem on/off and/or solo each AUX channel. In some embodiments, the audio editing system 100 may include a Link Mode, wherein users are allowed to select tracks and track stacks within the DAW 200, and the audio editing system 100 automatically selects them.

Within the Track List section of the main window, the automated bouncing module 114 allows for the user to collapse and expand multiple items in the track list, as well as select any combination of multiple tracks. The automated bouncing module 114 also provides a "Track Locking" feature. When locked, the automated bouncing module prevents additional tracks or track-stacks from being added to a stem. In addition, "locked" tracks/track-stacks will be bounced by the automated bouncing module 114 in combination with the tracks/track-stacks that are bounced one at a time.

The automated bouncing module 114 includes a naming convention editor, which dictates how bounced files are to be named. The Naming Convention Editor window allows for user preferences and settings to be entered. Through the naming convention editor, the automated bouncing module 114 provides the ability to save and recall custom Naming Token Groups, the ability to choose an arbitrary number for track number sequences, and the ability to choose padding of sequence digits (e.g., "01", "001", etc.). Further, the naming convention editor allows naming tokens based on "Marker Name" of where the current bounce range starts. In some embodiments, the naming convention editor provides for a naming token that includes the name of the parent track stack of the selected track.

During the auto-bouncing operations, the automated bouncing module 114 allows the user to pause or cancel bouncing operations. In response to the input module 110 receiving a cancel request, the digital audio editing system 100 returns the DAW 200 back to its original state during the initial scan. The automated bouncing module 114 is configured to alert the user if the metronome is left on and subsequently turn it off automatically. The automated bouncing module 114 monitors the performance of the bouncing operations (e.g., how long the bouncing took, elapsed time, number of tracks bounced) and may record the performance statistics in the storage medium 108. In some embodiments, the automated bouncing module 114 warns the user when the "Normalize" setting is turned "ON" and Stem mode is selected. Moreover, the automated bouncing module 114 automatically detects when the DAW 200 has completed a bounce and either starts the next bounce within the same job or moves on to the next job and starts bouncing again. The automated bouncing module 114 utilizes the bouncing technology of the DAW 200 to perform multiple bounces automatically based on the specified job list and names the resulting stem files, multi-track files, and/or mix files 160 according to the designated custom and dynamic naming conventions.

The audio editing system 100 further includes at least one storage medium 108 for saving the stems, multi-tracks, and/or mixes 160 created from the automated bouncing process conducted by the automated bouncing module 114. As described above, the storage medium 108 may also store job set files (including job bounce locations) and bounce performance statistics. The storage medium 108 is a non-transitory computer readable storage medium, such as (e.g., read only memory (ROM), random access memory (RAM), a hard disk drive, a compact disc (CD), a digital video disc (DVD), external cloud storage, server, or any other type of memory). In some embodiments, the stems, multi-tracks, and/or mixes 160 created by the DAW 200 under the control of the automated bouncing module 114 during the auto-bouncing process may be stored in the storage medium 108. In some embodiments, the automated bouncing module 114 may transmit the stems, multi-tracks, and/or mixes 160 to the storage medium 108 via the communications interface module 102. However, in other embodiments, the automated bouncing module 114 may be directly connected to the storage medium 108 so that the stems, multi-tracks, and/or mixes 160 are transmitted thereto without need of the communications interface module 102. The file types of the stems, multi-tracks, and/or mixes 160 recorded in the storage medium 108 may include, but are not limited to, MP3, AIFF, WAV, and M4A. The storage medium 108 may also be configured to save the user inputs and commands received by the input module 110. The user inputs and commands are forwarded by the input module 110 through a direct connection or alternatively by way of the communications interface module 102. In particular, user preferences for bouncing parameters and settings may be saved for future jobs and bouncing operations. In similar respects, the audio project and corresponding tracks 150 received by the scanner 112 from the DAW 200 may be saved in the storage medium 108, either by a direct connection between the scanner 112 and the storage medium 108 or through the communications interface module 102. Other audio data or information received by the audio editing system 100 from the DAW 200 may be saved in the storage medium 108.

After bouncing operations have been run for all jobs in the job list, a distributor 118 of the audio editing system 100 automatically notifies the user when bouncing has been completed. In some embodiments, the distributor 118 sends an email (indicating that the auto-bouncing operations have completed) over a network 130 to one or more destination devices 180 that are monitored, managed, and/or owned by the user. The destination device 180 may comprise a computer, laptop, tablet, smart phone, smart watch, or any other handheld personal device known in the art. In addition to email or alternatively, the distributor 118 may send a push notification and/or text message to the one or more destination devices 180 indicating that auto-bouncing operations have completed. In some embodiments, the distributor 118 of the audio editing system 100 automatically uploads all bounce-job output files (stem files, multi-track files, mix files) to a destination device 180 which is a cloud storage for file sharing with one or more interested parties, such as collaborators, project team members, engineers, clients, friends and family, etc. In addition, the distributor 118 automatically notifies one or more of these interested parties, by sending an email, text message, and/or push notification to their personal electronic devices 180 (e.g., computer, laptop, tablet, smart phone, smart watch, or any other handheld device), wherein the notification indicates the availability of the bounce-job output files and the location information to access the bounce-job output files (e.g., hyperlink). In addition to, or alternative to the cloud storage, the destination device 180 may be a local server associated with the audio editing system 100. Similarly, the distributor 118 automatically uploads all bounce-job output files to the local server and automatically sends notifications, by email, text message, and/or push notification, to the personal electronic devices 180 of one or more interested parties. In other embodiments, the destination platform 180 is a social media server, such as one managed by Twitter, TikTok, Instagram, Facebook, or the like, wherein the distributor 118 automatically posts the stems, multi-tracks, and/or mixes on one or more social media platforms to be heard by the general public or by a designated group of people (e.g., only friends/followers of the user). In some embodiments, the DAW 200 can perform further editing on the stems, multi-tracks, and/or mixes 160 and finalize them before distribution to an engineer, trailer house, music library, and/or client. In this regard, multiple versions of the stems, multi-tracks, and/or mixes 160 before and after editing (by the DAW) may be saved in the storage 208.

Referring back to FIG. 1, the audio editing system 100 may include an analytics module 116. The analytics module 116 collects and compiles performance data of the audio editing system, and more specifically the automated bouncing module 116. For example, the analytics module evaluates how the automated bouncing module 116 cooperates and coordinates bouncing operatioAW 200 in order to achieve efficient bouncing. The analytics module 116 monitors the number of tracks and/or track stacks that are used in a given job and the number of stems and/mixes that are bounced in the given job. In addition, the runtime for each job to be completed is measured by the analytics module 116. In some embodiments, the analytics module 116 may collect more detailed, micro data, such as the amount of time for each stem and/or each mix to bounce within a given job. Also, the total playtime for all stems and/or mixed bounced in a given job is recorded. The total playtime is calculated as the sum of the playtimes of each stem and each mix bounced in a single job. Every piece of data that is received by the audio editing system 100 may be timestamped by the input module 110, and every signal that is transmitted from the audio editing system 100 to the DAW 200 (host audio editing code 404 in FIG. 3) is also timestamped. The analytics module 116 may utilize the time stamps to determine how long individual components of the audio editing system 100 (e.g., scanner 312, automated bouncing module 314, distributor 116) are able to process data and provide a response, and thus gives insight as to how individual components of the audio editing system 100 are performing. The analytics module 116 may extrapolate from the recorded timing data to determine the amount of time (seconds, minutes, hours) saved by using the auto-bouncing feature of the audio editing system 100. The analytics module 116 may be configured to collect and compile the above statistical data and associate it with specific users. This configuration of the analytics module 116 can then present the amount of data bounced per user. Further, the analytics module 116 may keep track of any errors that may occur during auto-bouncing operations, which can later be used in diagnosing potential problems in the communication between the audio editing system 100 and the DAW 200 (host audio editing code 404 in FIG. 3). The above performance data may be received by the distributor 118 for automatic transmission to the destination devices 180. For example, the performance data may be automatically sent by the distributor 118 over the network 130 via email to one or more destination devices 180 that are monitored, managed, and/or owned by the user. In other embodiments, the performance data may be posted on destination platforms 180 (e.g., Twitter, TikTok, Instagram, Facebook, or the like) to publicly show the amount of time/effort that the audio editing system 100 has saved the user and to demonstrate the overall effectiveness of the audio editing system.

Herein below, various aspects of the bouncing automation process are described in detail. As shown in FIG. 1, the audio editing system 100 (Auto-Bounce) is communicatively connected to the DAW 200, such as Logic Pro. The audio editing system 100 may be configured so that at least the scanner 112 and the automated bouncing module 114 function as primary components of the audio editing system 100. That is, other applications or programs should not be running while the scanner 112 and the automated bouncing module 114 are performing their respective functions. The audio editing system 100 bounces through the Master Output Channel. In some embodiments, especially where the DAW 200 is equipped with multiple output buses/channels, the audio editing system 100 has the capacity to select (in response to user input) a particular channel or channels through which the auto-bouncing operations are to be performed and output. As such, the auto-bouncing operations are not limited to just the Master Output Channel. This is achieved by the automated bouncing module 114 communicating control signals to the DAW 200, wherein the control signals indicate which output channel(s) should be applied to the auto-bouncing operations. The control signals from the automated bouncing module 114 can selectively vary the states (enabled or disabled/bypass) of insert effects which are to be inserted into the signal chain during the auto-bouncing operations.

The automated bouncing module 114 supports bouncing in Stereo, Mono, and Surround. In some embodiments, the automated bouncing module 114 is configured to provide support for one of these sound types during a given auto-bouncing operation. That is, the automated bouncing module 114 is unable to switch between the three sound types. Accordingly, the Master Out Fader of the DAW 200 (track that allows the user to control the overall signal level that is being output by the DAW) must first be set, via the input device 206 and the DAW user interface, to the desired sound type before running the auto-bouncing operations of the audio editing system 100. For example, preferably for most users, the DAW 200 is arranged to have Stereo Master Out Fader as default. In other embodiments, the automated bouncing module 114 may have the capacity to switch between Stereo sound, Mono sound, and Surround sound. For example, the controller 104 of the audio editing system 100 may send a command signal 152 to the DAW to adjust the sound type of the Master Out Fader between consecutive jobs or consecutive auto-bouncing operations, based on pre-determined or previously entered user input. Accordingly, with each adjustment to the sound type of the Master Fader, the audio editing system 100 sends a scan signal 154 in which the scanner 112 scans the song/audio project currently loaded in the DAW 200 with the adjusted sound type.

The audio editing system 100 (Auto-Bounce) is designed for use after a song/audio project 150 has been finished on the DAW 200. Once the song/audio project 150 has been finished, the scanner 112 of the audio editing system 100 is initiated to scan the song/audio project 150 and obtain all of the tracks associated with the project and any corresponding track data. Thereafter, the automated bouncing module 114 controls the DAW 200 via bounce commands 158 to perform bouncing operations for each requested job in a single run, thereby automatically creating multiple stems, multi-tracks, and/or mixes. In some embodiments, before launching or opening the audio editing system 100, tracks and stacks (of the song/audio project) must be named ahead of time to identify them in the Auto-Bounce track list area. If the user were to change the track list in any way (e.g., rename a track, add a track, remove a track) after launching the audio editing system 100, it may be terminated and re-launched to re-scan the song/audio project. This will erase all previously entered or uploaded jobs and bounce settings.

Figure 4:
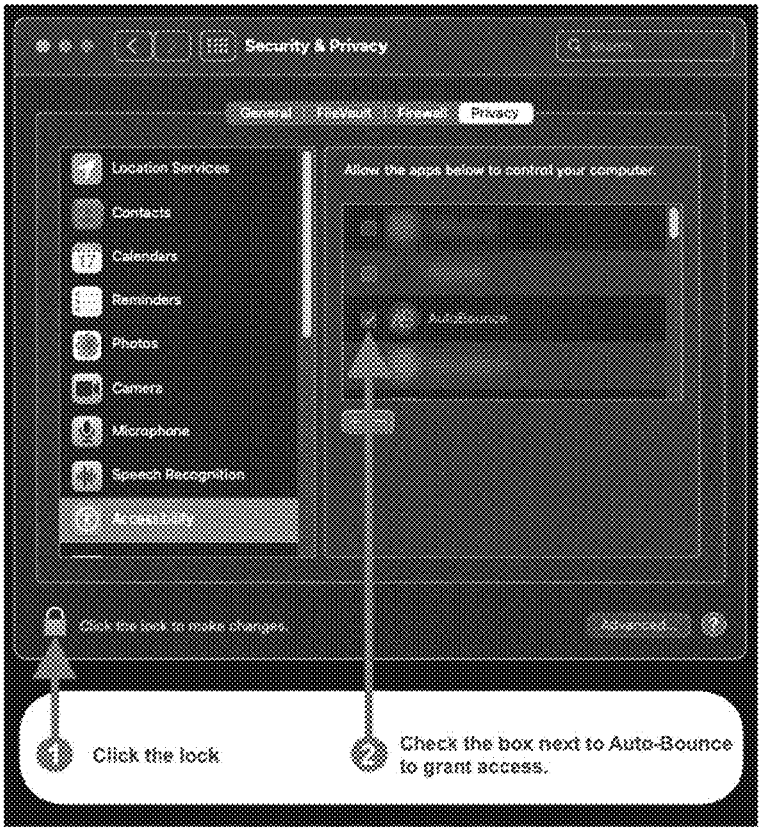
FIGS. 4-20 illustrate various features of the audio editing system shown in FIG. 1 and the audio editing companion application, plugin, or extension shown in FIG. 3.

The audio editing system 100 (Auto-Bounce) may require accessibility permission in order to interact with the DAW 200. Upon connecting the audio editing system 100, the DAW 200 may prompt the user to grant such permission. Alternatively, the user can manually grant permission by opening the system preference settings (e.g., security and privacy, accessibility) of the machine (e.g., computer) embodying the DAW 200, and adjusting the permissions to allow the audio editing system 100 to control the DAW 200, as shown in FIG. 4.

Figure 5:
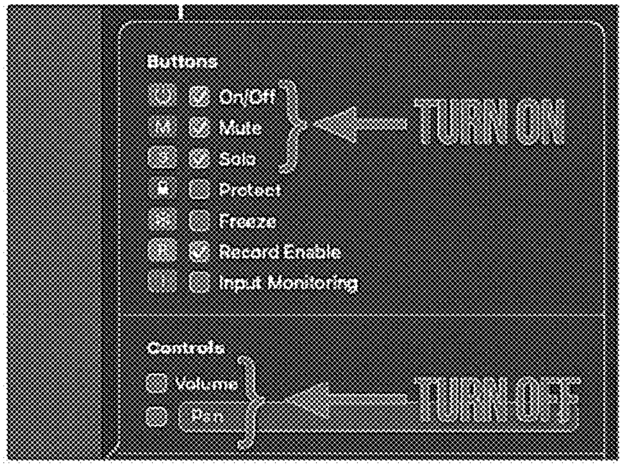
Figure 6:
Figure 7:
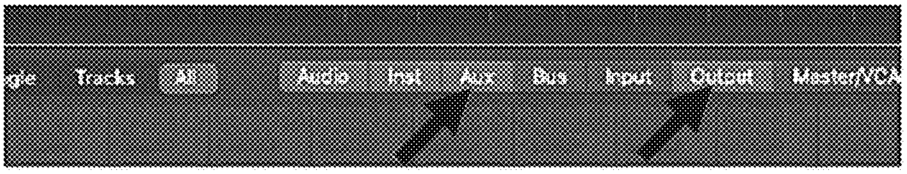

In addition, the DAW 200 may need to be configured to properly function with the audio editing system 100. For example, where the DAW 200 is Logic Pro, the audio editing system 100 requires that the On/Off, MUTE, and SOLO buttons are enabled and that Volume and Pan are disabled in track header components of the DAW 200, as shown in FIGS. 5-6. Also, the audio editing system 100 may require the DAW 200 to be arranged so that the On/Off button and the Track Names are visible in the Logic Pro track list, as shown in FIG. 6. The audio editing system 100 may require the control bar settings of the DAW 200, indicated by arrows in FIG. 7, to be enabled or turned on. If the above buttons are not visible in the control bar after turning them on, the user interface window of the DAW 200 may need to be enlarged to display them. It may be required that the AUX and OUTPUT buttons are visible in Logic Pro's Mixer window; these are automatically visible when the window is wide enough.

Figure 8:
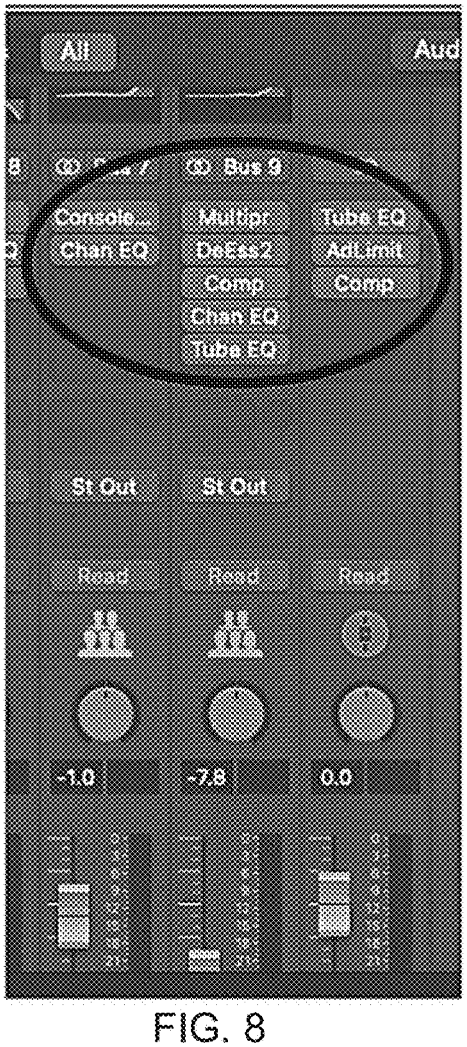
Figure 9:
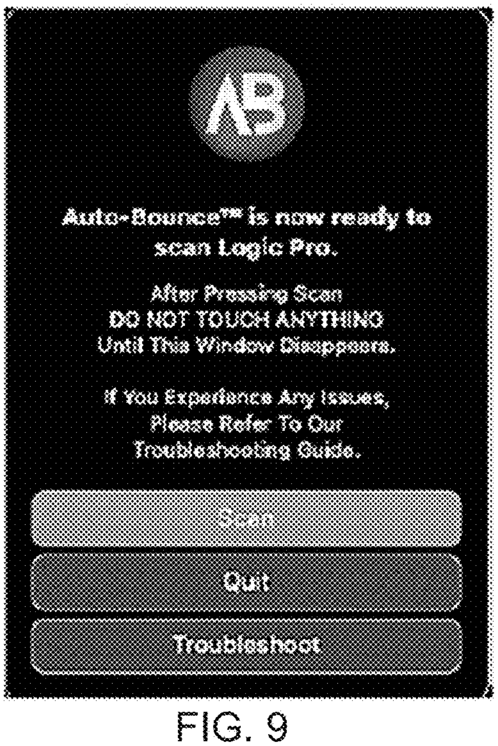

Before the scanner 112 of the audio editing system 100 performs the initial scan of the song/audio project, the DAW 200 may need to be configured so that plugin names of the mixer channels (e.g., "Console," "Chan EQ," "Multipr," "DeEss2," "Comp," "Tube EQ," "AdLimit") are visible, as shown in FIG. 8. This can be done by opening the mixer panel of the DAW 200. In some embodiments, once the DAW 200 is properly configured, the scanner 112 of the audio editing system 100 begins scanning the song/audio project, for example in response to the "SCAN" button in the user interface of the audio editing system 100 (FIG. 9) being engaged via the input device 106. In other embodiments, the scanner 112 of the audio editing system 100 may automatically initiate a scan once it detects a song/audio project has been loaded into the DAW 200. This process allows the audio editing system 100 to gather information it needs from the DAW 200 to automate the processing of running stems, multi-tracks, and/or mixes (i.e., bouncing). Also, to bounce stems using the audio editing system 100, it may be required in the DAW 200 to first group tracks into Track Stacks (usually a Folder Stack, although Summing Stacks may also work) prior to the scan. Then, in the audio editing system 100, the entire Track Stack is selectable as a single item to be bounced as a stem.

Figure 10:
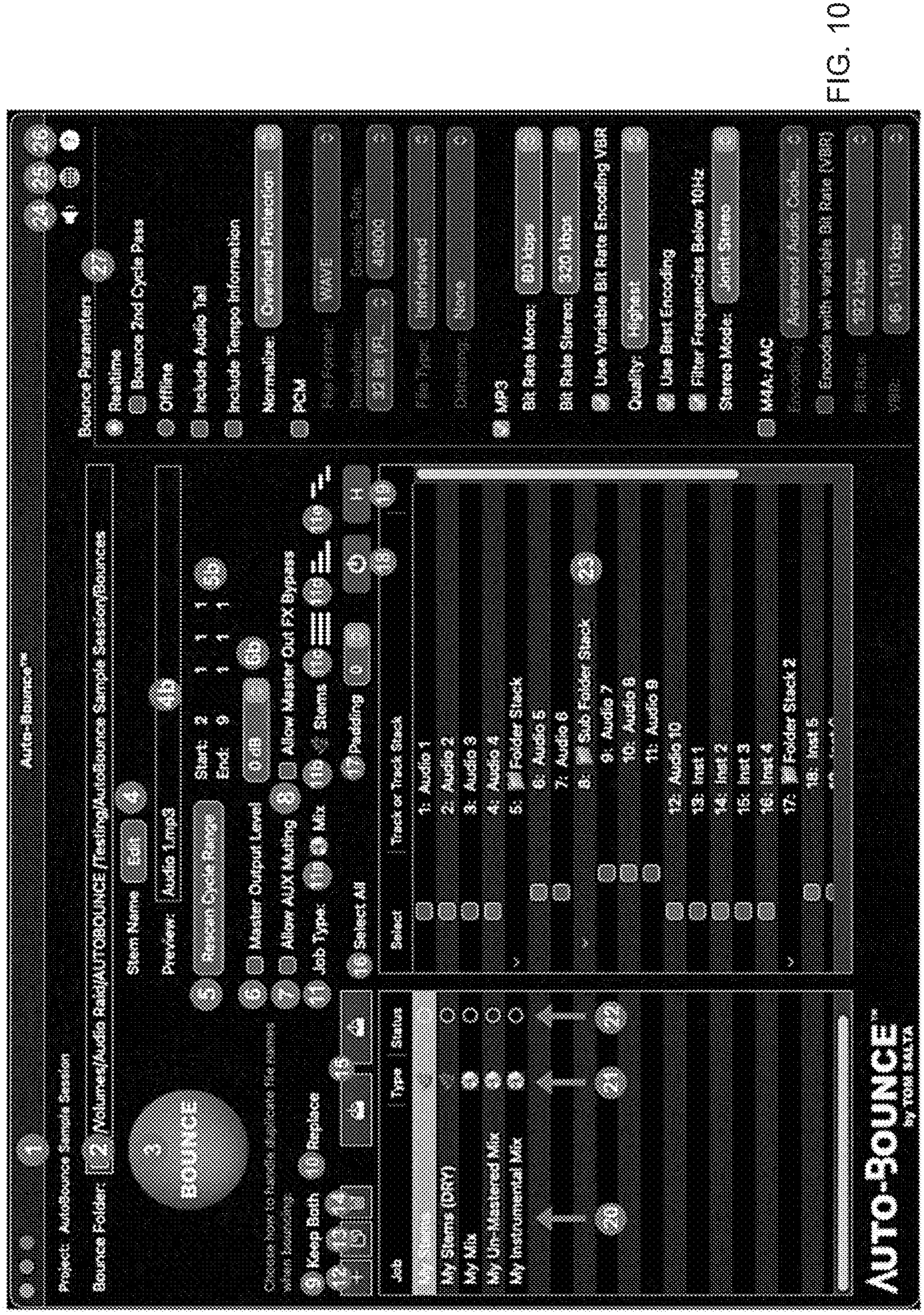

After a successful scan, auto-bounce preferences, settings and parameters can be accessed through the audio editing system 100. More specifically, once the scan is completed, the scan window shown in FIG. 9 will automatically close, and a main user interface window of the audio editing system 100 will appear with all information and data of the song/audio project. FIG. 10 depicts the main user interface window of the audio editing system 100 (Auto-Bounce), after performing a scan of the DAW 200, such as Logic Pro. Within FIG. 10, reference numbers 1-27 are used to indicate different features of the audio editing system 100 and are described as follows:

(1) Project Name—The name of the currently scanned Logic Pro project.

(2) Bounce Folder—The location where Auto-Bounce will export all Mixes and Stem Folders. This always defaults to the Bounce folder of the current Logic Project.

(3) Bounce and Status Button—Starts bouncing all jobs in the job list. It will also indicate if Auto-Bounce is working and provides the option to cancel the jobs, for example, by pressing it during operation.

(4) Naming Convention Edit Button—Opens the naming convention editor to specify how stems and mixes are to be named for the currently selected Job.

(**4*b***) Naming Convention Preview Window—This shows a preview of how the first stem, or the current mix, will be named.

(5) Rescan Cycle Range Button—Click to update the Start and End points of the selected job to match the current cycle range in Logic Pro.

(5*b*) Start/End Display—This feature shows the start and end points of the current job.

(6) Master Output Level Enable—This feature enables Auto-Bounce to set the level of the Master Out fader.

(6*b*) Master Output Volume—This feature provides for selecting a dB level for the Master Out fader between 0 and −6 dB for the current job.

(7) Allow AUX Muting—This mode will display all the AUX channels and provide the capability to mute any one or more (e.g., all) AUX channels (by unchecking corresponding checkboxes) that the user does not want to hear in the current job. This aspect of the audio editing system 100 (Auto-Bounce) serves as the means to create a set of "Dry" stems, such as by muting any reverbs or echoes being used as effect sends.

(8) Allow Master Out FX Bypass—This function enables bypassing (turning off) any FX inserts on the Master Out Fader. This function allows for exporting an "un-mastered" mix or set of stems, by unchecking (turning off) any mastering plugins. This is often used in conjunction with lowering the Master Output fader volume to avoid overloading if a limiter that was being used on the Master Out Fader is bypassed.

(9) "Keep Both" Mode—(Safest) This mode configures Auto-Bounce so that it will never overwrite any audio files. If an audio file exists with the same name as the intended export, a number will be appended to the end of the name.

(10) "Replace" Mode—This mode causes Auto-Bounce to overwrite any files with the same name as the intended export. This is preferred when users are certain that they want to replace previously exported files with new ones using the same name(s).

(11) Job Type—This feature allows for choosing between the various bounce modes on a per-job basis.

(11*a*) Mix Mode—In mix mode, every visible item (track or track stack) that is checked will be mixed down into a single mix. For example, for a Full Mix, all items should be selected (checked). For an instrumental, all items except the vocal tracks should be selected (checked).

(11*b*) Stem Mode—In stem mode, every visible item (track or track stack) that is checked will be exported as an individual stem. There may be three choices for Stem Mode, as discussed below.

(11*c*) Static Stem Mode—All Stems have the same start and end points.

(11*d*) Variable-End Stem Mode—All Stems have the same start point. The end point of the rightmost region in the range of the current job determines the end point for each stem.

11(*e*) Variable-Start/End Mode—The start and endpoints of each bounce are determined by the regions in the start/end range of the current job. This mode is intended for postproduction and sound design, not traditional stems, since the start points for each bounce can vary.

(12) Create New Job—This feature creates a new empty job and will set the start and end point to the current cycle range in Logic.

(13) Copy Selected Job—(Fastest) This feature copies the currently selected job, including the cycle range and all settings. This mode is faster and best used when users want to create a new job that shares similar settings to the job they are copying.

(14) Delete Selected Job—Deletes the currently selected job.

(15) Save/Load Job Sets—Save and Load Auto-Bounce job sets. This feature can only be used after an initial scan. If any of the elements in the loaded job set do not match the currently open song/audio project (e.g., Logic Pro project), a warning pop-up will appear, and those settings will be reset. This applies to the Track List, AUX Channels, and Master Out Insert Effects.

(16) Select/Deselect All—This feature provides toggling between selecting and de-selecting all visible tracks and track stacks in the list.

(17) Padding for Variable-Modes—This feature provides for choosing how many bars of additional padding that users want after the end point of each region in Vari-End and Vari-Start/End Mode. It is noted that the padding feature will not be added beyond the end point of the Cycle Range of the current job.

(18) Show/Hide Tracks that are set to OFF—This visibility toggle button will show or hide tracks set to "Off" in Logic Pro. This removes visual clutter and eliminates the possibility of bouncing unwanted tracks. In some embodiments, Auto-Bounce will bounce any tracks that are Off if they are selected (checked) and will return them to OFF once the bouncing is completed. This feature may be indicated by different colors in the main user interface window of the audio editing system 100 (Auto-Bounce) to designate different status. For example, the visibility toggle button may be colored gray to indicate that the tracks set to "Off" in Logic Pro when Auto-Bounce scanned the project are invisible. The visibility toggle button may be colored blue, for example, to indicate that the tracks set to "Off" in Logic Pro when Auto-Bounce scanned the project are visible.

(19) Show/Hide Hidden Tracks—This visibility toggle button will show or hide tracks set to "Hidden" in Logic Pro. This makes it easy to remove visual clutter. As in Logic Pro, a first color icon (e.g., gray) means there are no hidden tracks, a second color icon (e.g., green) means hidden tracks are visible, and a third color icon (e.g., orange) means hidden tracks are not visible. In some embodiments, Auto-Bounce is configured such that if anything is not visible on the screen, it will not be bounced. Accordingly, if a user wants any hidden tracks or tracks set to Off, they must be made visible in Auto-Bounce and selected.

(20) Job List—This feature lists all jobs in the current Auto-Bounce session. A "job" is a set of stems or a single mix. The two "Bounce Type" Radio Buttons determine the type of job. (see #11*a* and #11*b*).

(21) Job Type—This feature indicates whether the current job is set to Stem mode or Mix mode (by icons) and makes it easy to visually determine a job's type even when it is not selected.

(22) Status Indicator—When Auto-Bounce is running, this area will display a checkmark once that job has been completed.

(23) Track List—This area displays all tracks, track stacks, and nested track stacks. It can also display all AUX channels and Master Out FX inserts when those options are turned on (see #7 and #8). The presence of a dropdown arrow on the left, along with a folder icon next to the track name, indicates that it is a track stack (either a Folder Stack or Summing Stack). Logic Pro also allows for nested stacks, and Auto-Bounce provides visual aids that make it easy to tell the difference between a track stack and a regular track.

(24) Alert Sound Preview button—This feature will play the "All Bounce Jobs Finished" audio alert sound and enables users to set the desired volume on the monitor (s) of the audio editing system (Auto-Bounce).

(25) Website button—This feature will take users to the Auto-Bounce website.

(26) Help button—This feature will take users to the Auto-Bounce Knowledge Base.

(27) Bounce Parameters—This area allows you to customize the Logic Pro bounce parameters for the current job. When Auto-Bounce scans the Logic Pro project, it will also scan and mirror current Bounce settings in Auto-Bounce. A key feature of Auto-Bounce is that it provides for adjustment to these settings on a per-job basis. As in Logic Pro, Auto-Bounce is configured to simultaneously export multiple audio file formats, like a WAV and MP3. There is no need to create a separate job in this case.

Figure 11:
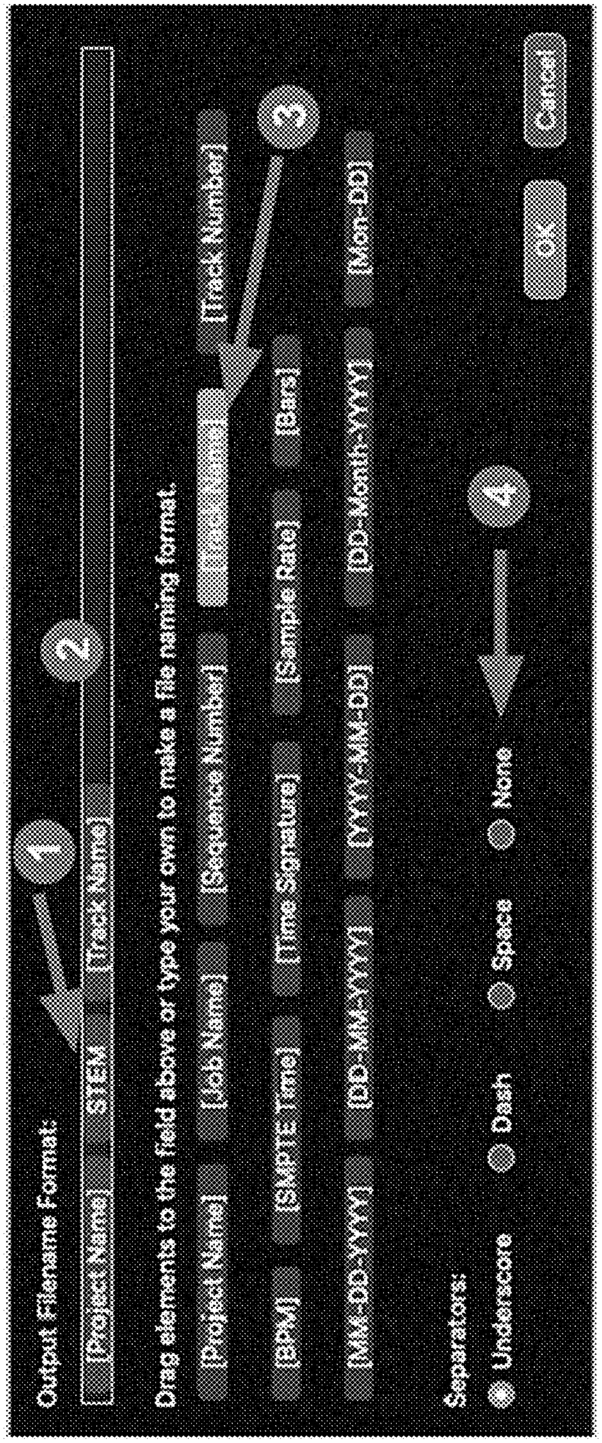

The audio editing system 100, and for example the controller 104 and/or the automated bouncing module 114, includes a naming convention editor, as shown in FIG. 11. The naming convention editor provides for users to specify how they want their stems and mixes to be named for the currently selected Job. Naming blocks are used to define the naming convention. This is especially useful in Stem Mode since each stem will have a different name which the audio editing system 100 is designed to automatically create for users. Within FIG. 11, reference numbers 1-4 are used to indicate different features of the naming convention editor of the audio editing system 100 (Auto-Bounce) and are describe as follows:

(1) Custom Naming Blocks—The block that says "STEM" (without brackets) is a custom naming block that users can create by typing directly in the Output Filename Format Field. Once users finish typing the custom name, a new block is created in response to user input (e.g., pressing Return key).

(2) Output Filename Format Field—The area where users can type in a naming block and/or drag in any of the dynamic naming blocks.

(3) Dynamic Naming Blocks—These elements are used to create Naming Blocks that automatically update based on factors like the project name, track name, SMPTE Time, Sample Rate, Date, etc. They can be dragged into the Output Filename Format Field, and they can also be copied and pasted into the Naming Convention Editor window of another job. Dynamic naming blocks are an important time-saving tool as it frees users from manually updating/entering the name of every file that is created and exported. For example, besides automatically filling in track names, Auto-Bounce can automatically add the starting SMPTE time of the area users are bouncing. As another example, Auto-Bounce can automatically add the current area's time signature and BPM to all mixes and stems.

(4) Separator Type—Radio buttons that allow users to define what type of separator will be used between Naming Blocks when bounced.

Figure 12:
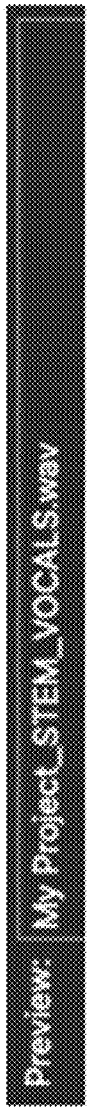

The Output Filename Format field allows users to type directly into it or drag in any of the dynamic naming blocks. Each time users type something and press Return, a new naming block is created. These blocks can be rearranged in any order according to user preference. They can be copied from Job to Job with a standard copy-and-paste. Additionally, users can choose what kind of separators (e.g., Underscore, Dash, Space, or None) they want in between each naming box. After pressing the OK button, users will immediately see a preview of what the file names will look like in the Preview area, as shown in FIG. 12. As a first example, if users wish for stems to automatically be named to include sequential numbers, the Logic Project Name, and the Track Name with an underscore between each, they merely need to drag these three Dynamic Naming Blocks into the naming area and click the Underscore Radio button. As a second example, if users wish for stems to have custom text, followed by the track name, and then some more custom text, all with spaces in between, they merely need to type the custom text and press Return. Auto-Bounce will then display a new naming box with the custom text, at which point users can drag in the "Track Name" Dynamic Name Block and finish by typing more custom text and pressing Return. Thereafter, users need only click the "Space" radio button in the separators section. A preview of the stem name format will be displayed (FIG. 12).

Figure 13:
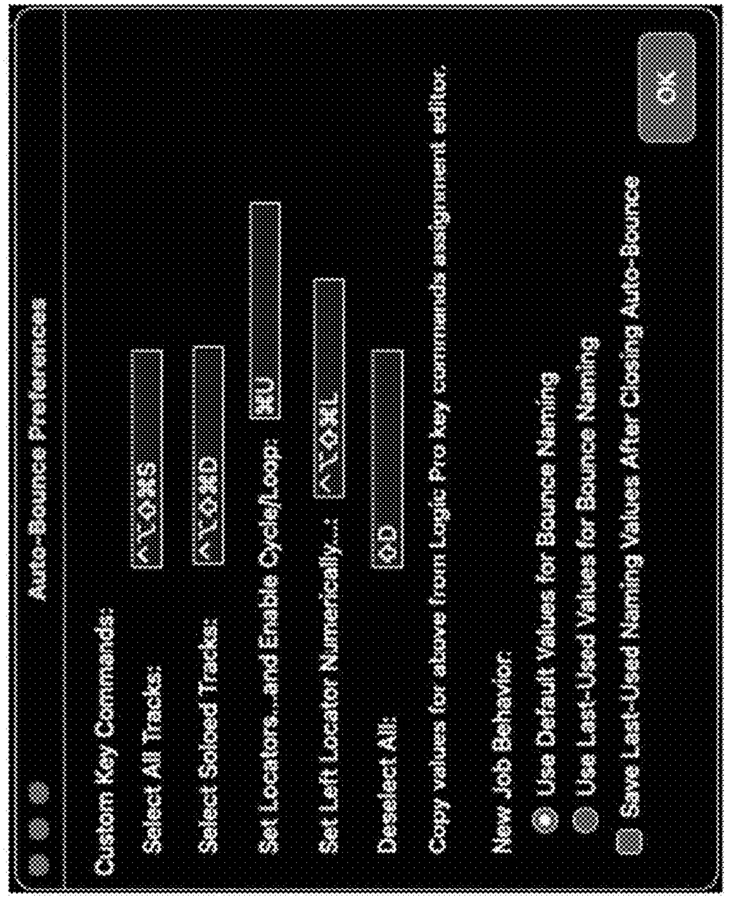

The audio editing system 100, and for example the controller 104 and/or the automated bouncing module 114, includes a Preferences module which may be displayed as shown in FIG. 13. The Preferences module enables users to set key commands. In some embodiments, these commands are required to be set in both the DAW 200 (e.g., Logic Pro) and the audio editing system 100 (Auto-Bounce). The Preferences module also provides options to set behavior of new Jobs, such as Use default values for bounce naming or Use last-used values for bounce naming. The Preferences module further provides for saving the last-used values after quitting the audio editing system 100.

All of the above described aspects and features of the audio editing system 100 can be engaged/disengaged, selected/unselected, enabled/disabled, and/or adjusted via the input device 106 and input module 110.

Figure 14:
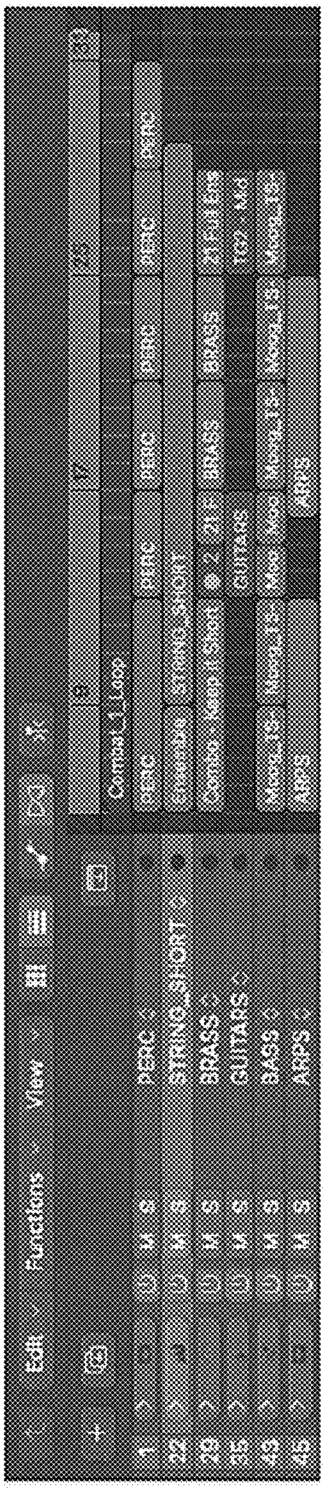

A method of performing automated bouncing with the audio editing system 100 is now described. The method includes the steps of preparing a project session in the DAW 200 (e.g., Logic Pro session) and organizing tracks into Folder Stacks. The step of organizing may include a step of naming the Folder Stacks according to user preference for naming the stems (which will be created by the bouncing operations). Alternatively, individual tracks can be bounced individually and thus the organizing step may be omitted. FIG. 14 shows an example of how the DAW track list (e.g., Logic Pro track list) may look.

Figure 15:
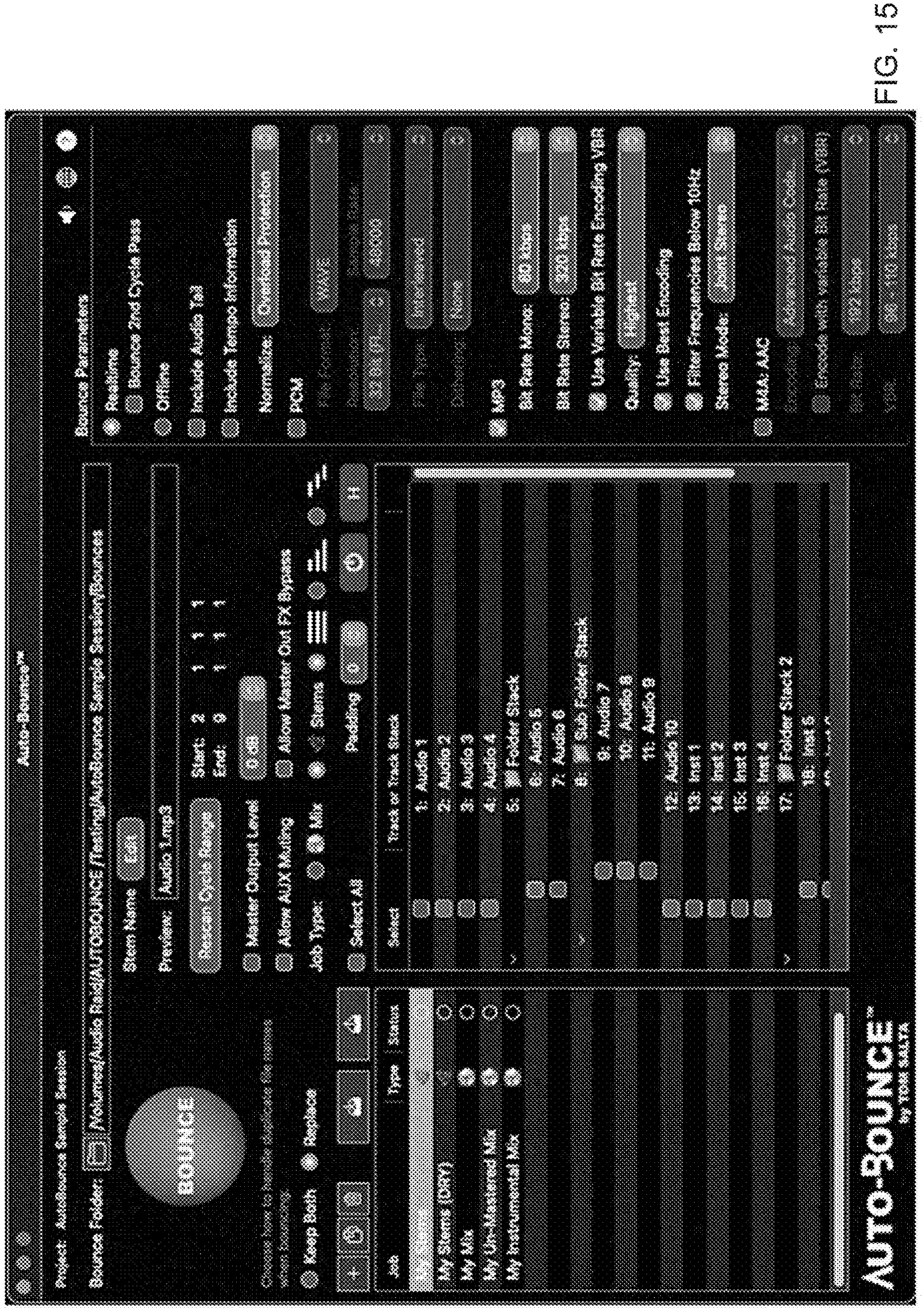

Then, the audio editing system 100 (Auto-Bounce) is turned on, opened, or launched. The method includes the steps of scanning the song/audio project via the audio editing system 100 and more specifically the scanner 112, and then creating jobs for the bouncing operations. For example, a set of multiple jobs comprising a Full Mix, an Unmastered Mix, and a set of Wet and Dry Stems may be created. FIG. 15 shows an example of how the main interface of the audio editing system 100 may look.

Thereafter, the method includes selecting the tracks (listed in the main interface of the audio editing system 100, see FIG. 15) to be bounced. It must be verified that each job has at least one track or track stack selected for bouncing. In addition, various parameters of the bouncing operations may be set according to user preference, such as Stem Mode or Mix Mode. In Stem Mode, each selection will become a separate stem. In Mix Mode, all selections are included in a single mix.

Figure 16:
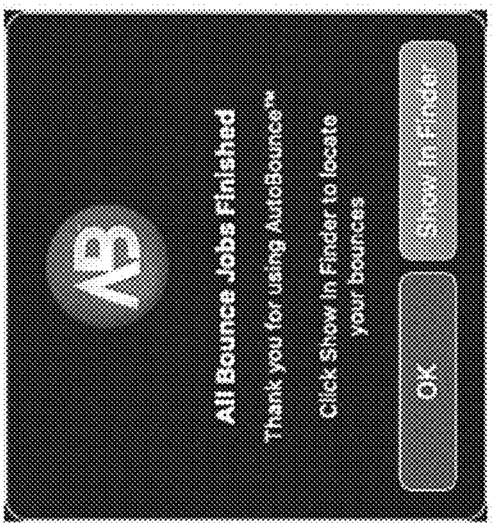

Once one or more tracks are chosen or assigned to each job and the bouncing parameters are set, the bouncing operations are initiated, for example by engaging a "START" or "BOUNCE" button (FIG. 15). At this point, the user need only wait for the jobs to finish, and more importantly, can utilize this time to do other things. When the automated bouncing operations have completed, a notification is produced; that is, the audio editing system 100 may display an "All Bounce Jobs Finished" window and provide an audible alert sound (FIG. 16).

Figure 17:
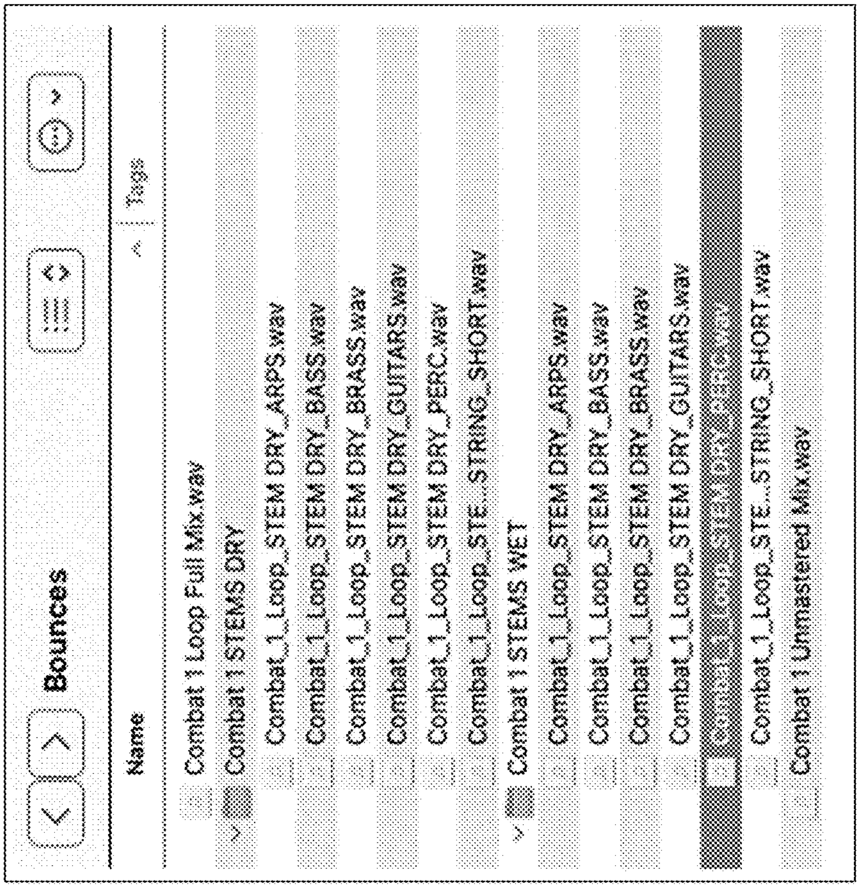

Afterwards, all the stems and mixes that have been automatically bounced are saved in a bounce folder in the storage medium 108 of the audio editing system 100. FIG. 17 shows an example of how the bounce folder may look. In some embodiments, the stems and mixes 160 may be saved in the storage 208 and/or may be transmitted to destination device(s)/platform(s) 180.

As mentioned above, there are two modes for bouncing: Stem Mode and Mix Mode. A more detailed description of steps for bouncing Stems and Mixes is provided in two sections below; however, both modes can be utilized at once in auto-bouncing operations for a series of jobs. This particular aspect of the present teachings constitutes one advantage of running multiple jobs in a single pass and thus saving users time.

Figure 18:
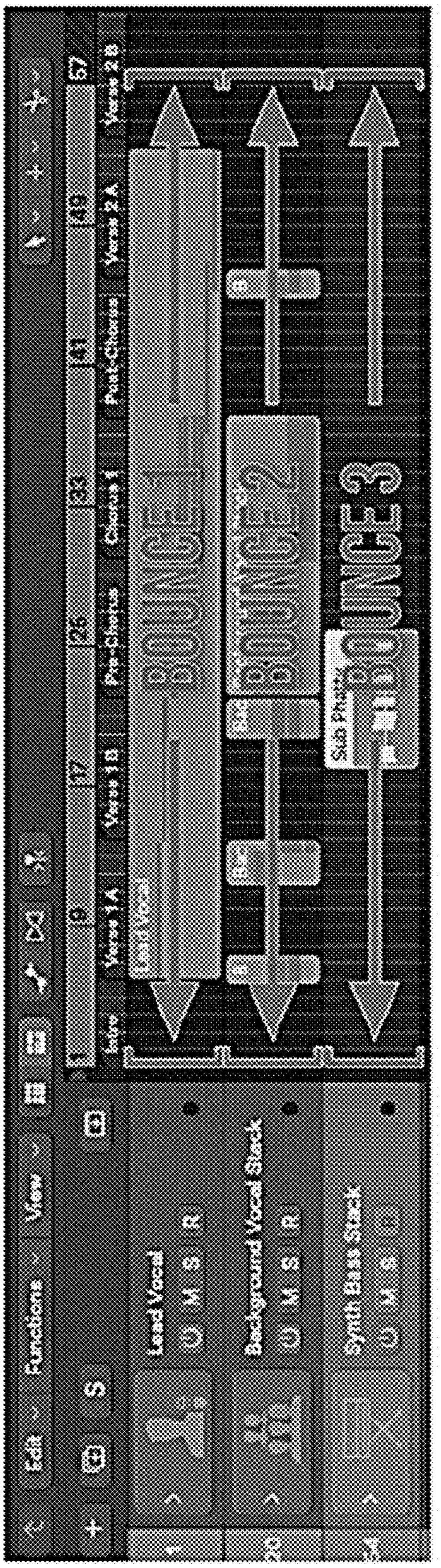

Bouncing STEMS in "Static Mode" (same start/end point for all stems). Referring to FIG. 18, the method includes the following steps:

Open or launch the audio editing system 100 (Auto-Bounce) and run the initial scan. The text "New Job" then appears in the Job List window. If users have already done this and want to create a second job, press the New Job button (+) or Copy Button and make sure the Bounce Type is set to "Stems." This step is important as Auto-Bounce will run ALL Jobs in the job list. It is the most time efficient to create all the jobs that a user wants to bounce simultaneously. As one example, creating a single job in STEM mode is described.

Verify that the Start and End points are positioned according to user preferences for where stems are to start and end. If not positioned properly to user preferences, set the cycle range in the DAW 200 (e.g., Logic Pro) and initiate "Scan Cycle Range" in the audio editing system 100 (Auto-Bounce).

Rename the Job in the Job list (within the audio editing system 100) by double-clicking on the current name and typing what the user wants. In Stem Mode, the Job name will become the name of the folder that the Stems are exported into for that job. This is different in Mix mode, in which, by default, the Job name becomes the name of the Mix file.

Select the tracks and/or track stacks to be bounced. In Stem Mode, each visible checked item will be bounced as an individual stem. This allows users to quickly and easily choose an entire track list, and each checked item (track or track stack) will be exported individually.

Optional: Customize the naming convention of the stem by pressing the "Edit" button (in the Naming Convention Editor, as previously described).

Optional: Check bounce parameters are set to user preferences. Since Auto-Bounce will use current bounce parameters in Logic Pro's Bounce window, the bounce parameters should be set according to user preferences in Logic Pro first before using Auto-Bounce, as this will save time.

Press the "START" or "BOUNCE" button in Auto-Bounce to begin the bouncing operations, wherein Auto-Bounce will automatically run all jobs in the job list. When finished, the bounced files are stored in the bounce folder. Further, more jobs can be run in Auto-Bounce. When the automated bouncing operations have completed, a notification is produced; that is, the audio editing system 100 may display an "All Bounce Jobs Finished" window and provide an audible alert sound (FIG. 16).

Figure 19:
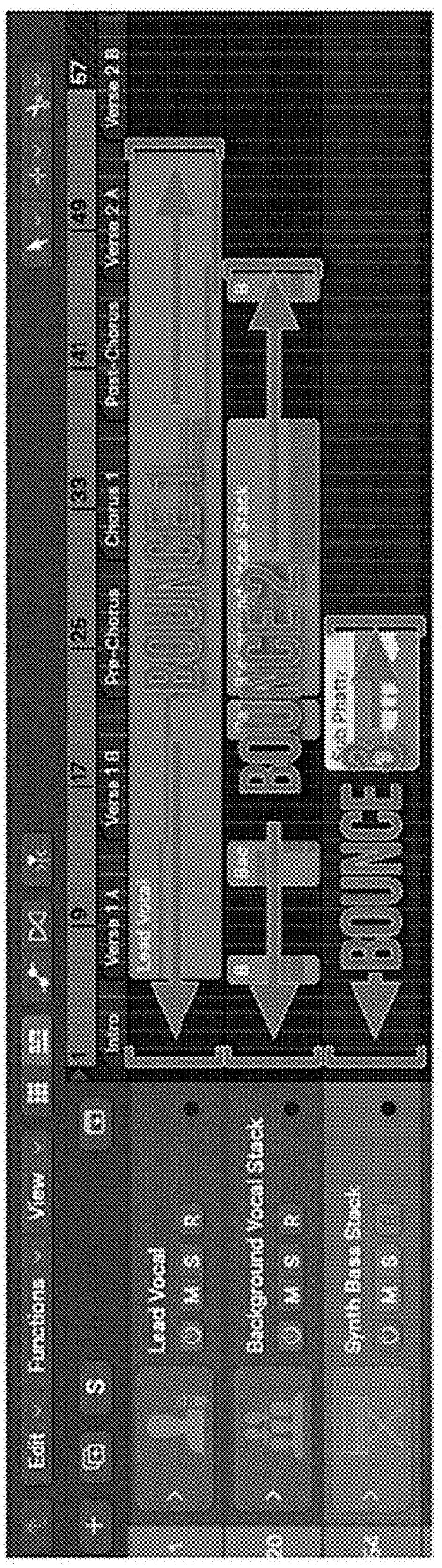

Bouncing STEMS in "Variable End Mode" (same start, different endpoint for each stem). Referring to FIG. 19, the purpose of "Variable End Mode" is to save time and disk space by skipping any empty space at the end of each stem. The setup procedure is identical to Bouncing Stems in "Static Mode." The audio editing system 100 (Auto-Bounce) will do some additional steps to determine the range to bounce. It will bounce from the same start point up until the end of the last region of the selected track/stack in the chosen range. The user has the option of adding up to 4 bars of additional "padding" after each stem. This is useful to ensure that any releases or effect tails are not cut off at the end of each "vari-stem."

Figure 20:
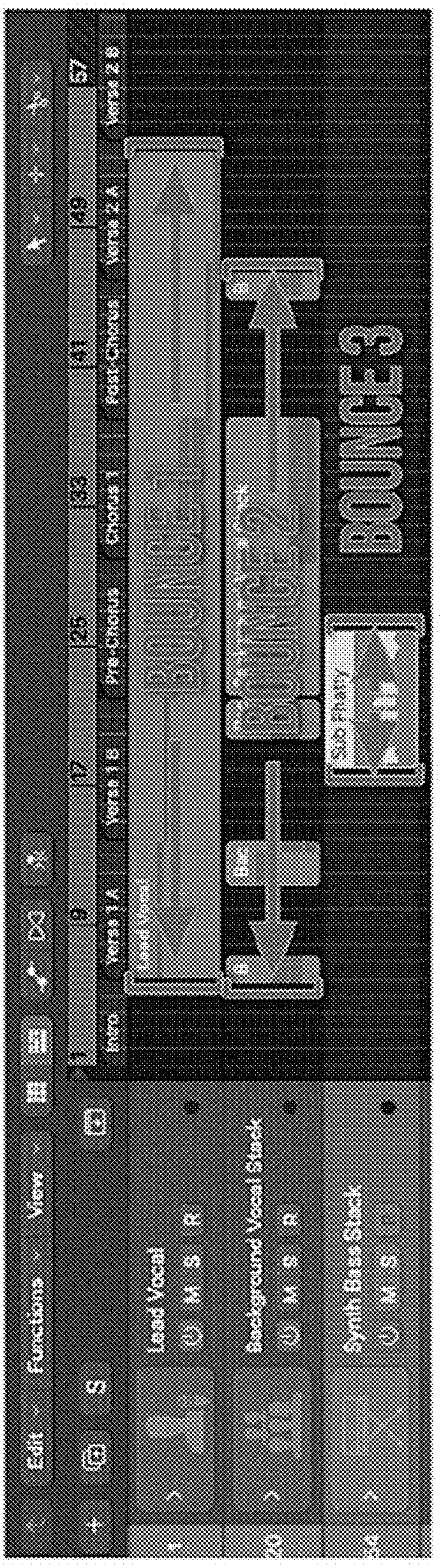

Bouncing STEMS in "Variable Start & End Mode" (Different start and endpoint for each stem). Referring to FIG. 20, the purpose of "Variable Start & End Mode" is to export audio files based on the regions themselves. This is beneficial for post-production and sound design. It is NOT meant for traditional "stems" since the start points can vary between bounces. The setup procedure is identical to Bouncing Stems in "Static Mode."

Both "Vari-Modes" will only look at the regions inside the Start & End Range of the current job. This is intentional and gives users more flexibility. If it is desired to bounce an entire Logic Pro Project in Vari-Mode, verify that the Start-End Range includes all the regions in the project.

Bouncing Mixes. For bouncing mixes, the method includes the following steps:

Open or launch the audio editing system 100 (Auto-Bounce) and run the initial scan. The text "New Job" then appears in the Job List window. If users have already done this and want to create a second job, press the New Job button (+) or Copy Button and make sure the Bounce Type is set to "Mix". This step is important as Auto-Bounce will run ALL Jobs in the job list. It is the most time efficient to create all the jobs that a user wants to bounce at the same time. As one example, creating a single job in MIX mode is described. If a previous job already exists, users can rename and reconfigure it to run a Mix or delete previous jobs and make a new one.

Verify that the Start and End points are positioned according to user preferences for where stems are to start and end. If not positioned properly to user preferences, set the cycle range in the DAW 200 (e.g., Logic Pro) and initiate "Scan Cycle Range" in Auto-Bounce.

Name the Job in the Job list (within the audio editing system 100). In Mix Mode, the Job name will be the name of the Mix file. For example, if there is a need to run multiple mixes with different sample rates, users can create multiple mix jobs, each with a different sample rate, and use Auto-Bounce to automatically add the sample rate to the mix name using the "Sample Rate" dynamic naming block.

Select the tracks and/or track stacks to be bounced. In Mix Mode, all visible checked items will be included in the mix. By default, all tracks and track stacks are selected in Mix Mode. This is the equivalent of running a full mix.

Optional: Customize the naming convention of the mix by pressing the "Edit" button (in the Naming Convention Editor, as previously described). For example, the Auto-Bounce may be configured so that the date is automatically appended to the mix name.

Optional: Check bounce parameters are set to user preferences. Since Auto-Bounce will use current bounce parameters in Logic Pro's Bounce window, the bounce parameters should be set according to user preferences in Logic Pro first before using Auto-Bounce, as this will save time.

Press the "START" or "BOUNCE" button in Auto-Bounce to begin the bouncing operations, wherein Auto-Bounce will automatically run all jobs in the job list. When finished, the bounced files are stored in the bounce folder. Further, more jobs can be run in Auto-Bounce. When the automated bouncing operations have completed, a notification is produced; that is, the audio editing system 100 may display an "All Bounce Jobs Finished" window and provide an audible alert sound (FIG. 16).

Figure 2:
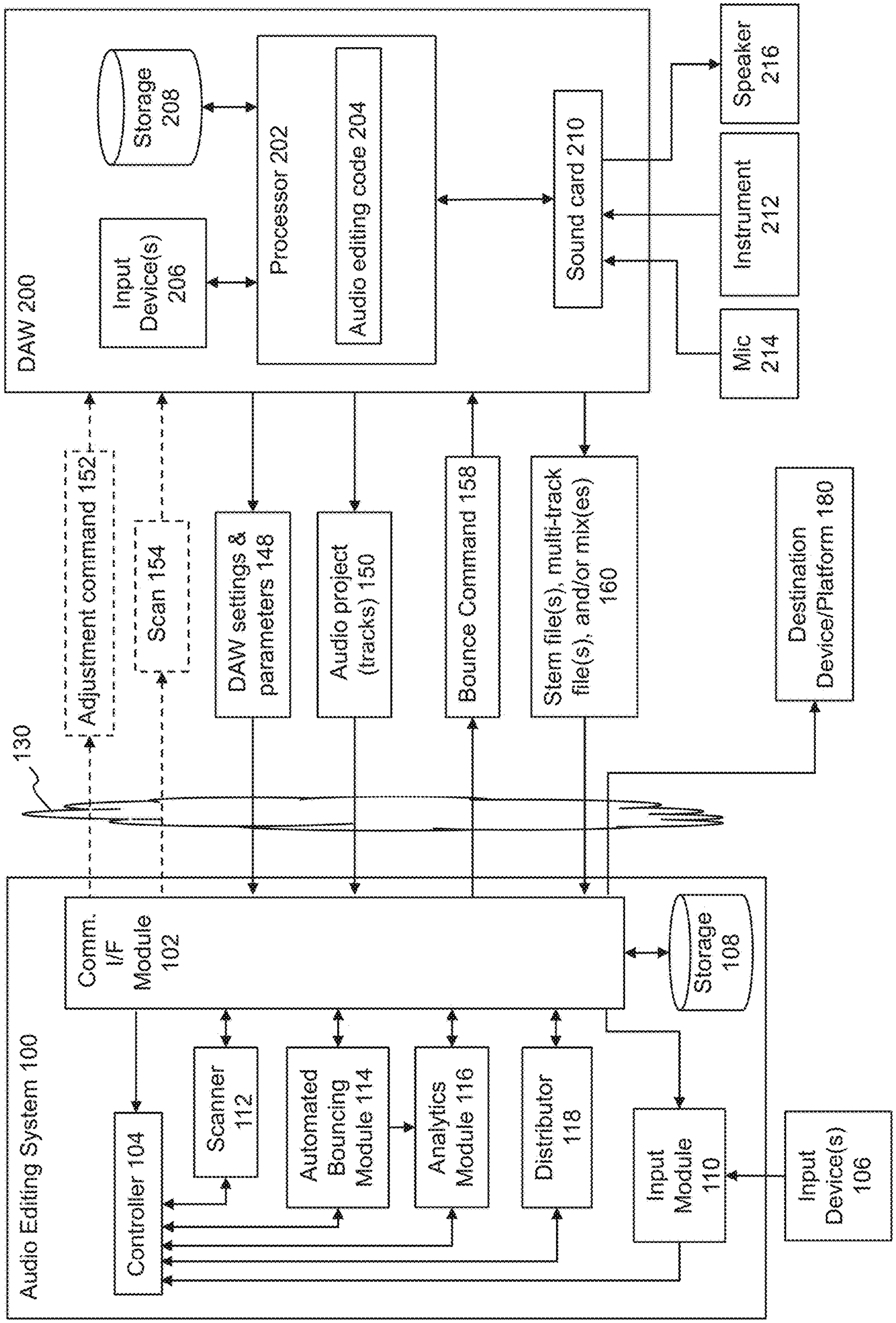
FIG. 2 is a schematic diagram of the audio editing system shown in FIG. 1, wherein the digital audio workstation and the audio editing system are connected through a network.

Referring to FIG. 2, the audio editing system 100 and the digital audio workstation 200 correspond to those shown in FIG. 1. However, instead of being directly connected to the DAW 200, the audio editing system 100 communicates with the DAW 200 over a network 130, such as a LAN, MAN, WAN, CAN, HAN, or the internet. The audio editing system 100 and the digital audio workstation 200 of FIG. 2 has all of the same structures, features, aspects, and/or functions disclosed above with respect to FIGS. 1 and 4-20.

Figure 3:
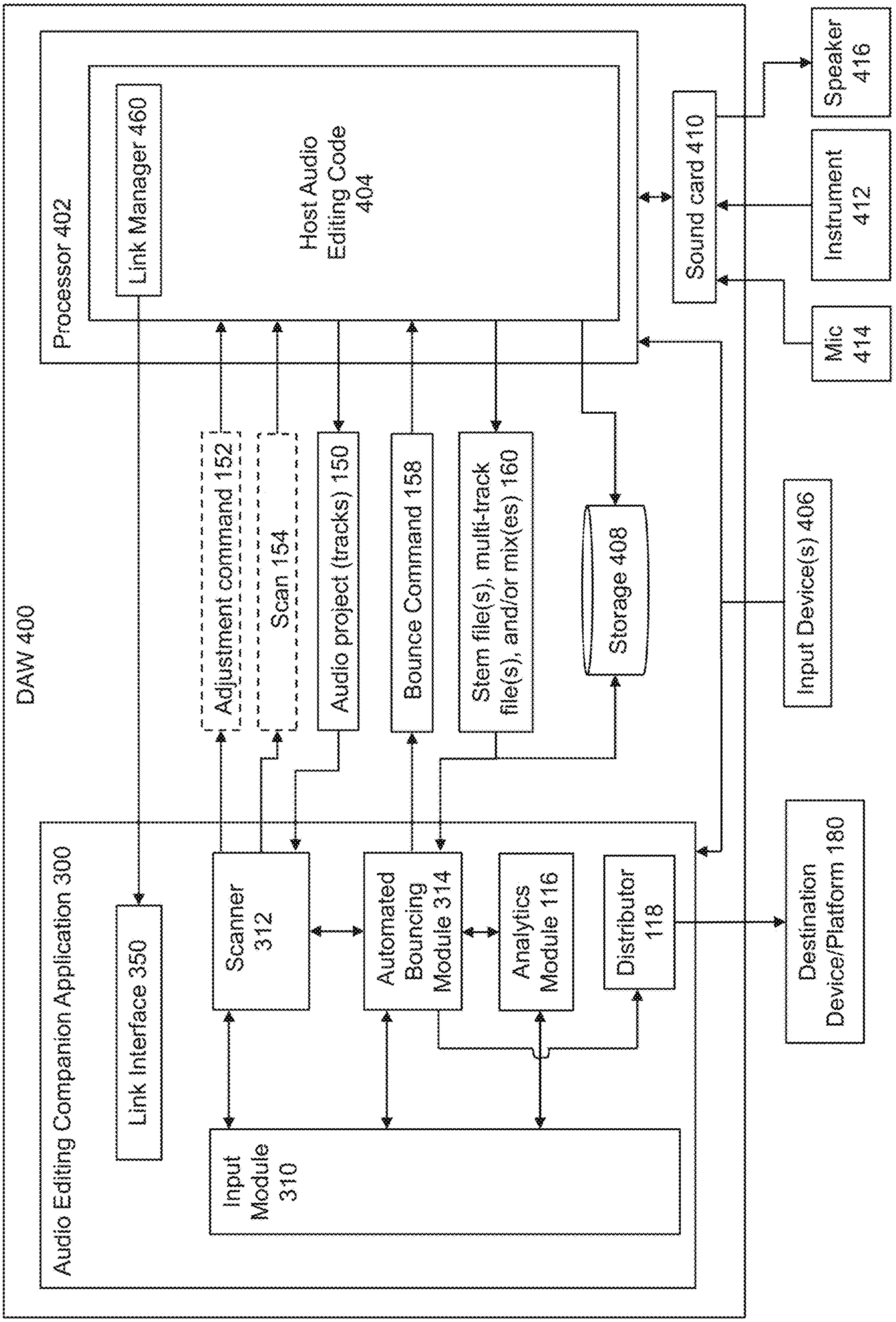
FIG. 3 is a schematic diagram of an audio editing companion application, plugin, or extension that provides automated bouncing operations to a digital audio workstation or audio editing system.

FIG. 3 is a schematic diagram of a companion application 300 according to the present teachings. The companion application 300 may be an application component, plugin, add-on, or extension that links with the existing audio production and editing program 404 of the digital audio workstation 400. The companion application 300, which is installed in the DAW 400 and may be executed by the processor 402 or by another processing device (not shown), adds a specific functionality, i.e., automated bouncing, to the audio production and editing program 404, thereby extending the capabilities of the digital audio workstation 400 without requiring any changes to its core code. The companion application 300 works by integrating with the main application 404 through a defined interface. The main application provides necessary interfaces and tools, allowing the companion application 300 to integrate and operate in conjunction with the main application 404. As shown in FIG. 3, the DAW 400 may be embodied as a computer comprising a processor 402 executing audio production and editing program code 404, a sound card(s) or audio interface(s) 410 (e.g., MIDI), at least one user input device 406 for adding or modifying data, and a non-transitory computer readable storage medium 408 (e.g., hard disk drive, external cloud storage, server, etc.) for saving song/audio project files and data. The at least one input device 406 may be a computer keyboard, mouse, or trackpad. One or more musical instruments 412, microphone(s) 414, and speaker(s) 416 may be connected to the DAW 400 through the sound card 410.

The DAW 400 includes a link manager 460, such as a plugin manager, which provides hooks or APIs 350 that the companion application 300 must use to interact with the audio production and editing program 404. The link interface 350 (e.g., plugin interface) registers the companion application 300 with the audio production and editing program 404 and acts as a bridge between the audio production and editing program 404 and the companion application 300. The link interface defines methods, properties, and/or events that the companion application 300 must implement to ensure proper communication between the companion application 300 and the audio production and editing program 404.

The companion application 300 comprises an input module 410, a scanner 412, and automated bouncing module 414, which together provide automatic bouncing of complete sets of stems with minimal user instruction, involvement, and interaction, as described above with respect to FIGS. 1 and 4-20. The processor 402 or another processing device in the DAW 400 may control the functions of the input module 310, scanner 312, and automated bouncing module 314 and may initialize and initiate the auto-bouncing operations to be performed by the automated bouncing module 314. The input module 310 receives user input data from the input device(s) 406, such as a keyboard, mouse, or trackpad. The input module 310, scanner 312, and automated bouncing module 314 operate in the same manner as the input module 110, scanner 112, and automated bouncing module 114 described above with respect to FIGS. 1 and 4-20.

The scanner 312 is configured to scan the song/audio project currently loaded in the main application 404 so as to retrieve the tracks that make up the song/audio project, as well as to obtain information related to the tracks, collectively designated by reference number 150 in FIG. 3. More specifically, the scanner 312 first checks whether there is an open song/audio project in the DAW 200 by sending an inquiry signal to the main application (audio production and editing program) 404. In some embodiments, if the main application 402 responds to the inquiry signal with a negative answer, the scanner 312 then sends a notification (e.g., displaying a pop-up window on the monitor of the DAW 400 and/or playing a sound) to the user to open a project. If the main application 402 responds to the inquiry signal with a positive answer, the scanner 312 checks the version of the DAW 400 (i.e., version of the audio production and editing program 404 running on the DAW) and detects which language the audio production and editing program 404 is set to. The scanner 312 provides a warning—with a pop-up notification and/or an audible sound—indicating that the audio production and editing program 404 is using a language unsupported by the companion application 300. Conversely, if a supported language (e.g., English) is being used by the audio production and editing program 404, the scanner 312 proceeds with further checks of the DAW setup. For example, the companion application 300 may be configured such that it provides auto-bouncing operations when the audio production and editing program 404 is the only other primary application running on the DAW 400. In this regard, the scanner 312 checks to see if there are any application windows associated with programs other than the audio production and editing program 404 that may be open on the DAW 400. If so, the scanner 312 may issue a notification (e.g., displaying a pop-up window on the monitor of the DAW 400 and/or playing a sound) instructing the user to close all open windows that may conflict with auto-bouncing operations (e.g., all windows other than those related to the companion application 300 and those related to the audio production and editing program 404). The scanner 312 verifies that all required Control Bar and Display buttons of the DAW 400 (more specifically, the Control Bar and Display buttons of the user interface generated by the audio production and editing program 404) are visible on the monitor(s). The scanner 312 further verifies that all required Track Header information is visible on the monitor(s) of the DAW 400 (i.e., displayed in the user interface generated by the audio production and editing program 404). Should the scanner 112 detect that some required Control Bar and Display buttons and/or Track Header information are hidden, the scanner 112 will provide a warning—with a pop-up notification and/or an audible sound—alerting the user to make necessary adjustments to the DAW 200.

In addition to conducting the initial checks, the scanner 312 identifies which tracks are hidden in the audio production and editing program 404 and makes all hidden tracks visible. The scanner 312 also identifies which tracks are set to "Off." Any "Track Stacks" that are collapsed are expanded by the scanner 312, which then imports the names and numbers of all tracks and track stacks from the audio production and editing program 404. The scanner 312 notes whether a track stack is collapsed or expanded in the audio production and editing program 404. Thereafter, the scanner 312 opens the Mixer Panel of the audio production and editing program 404, reads in the names of all AUX Channels, reads in the names of all Master Output Fader Insert FX, and identifies which AUX channels are currently muted in the DAW 400. Further, the scanner 312 opens the bounce window of the audio production and editing program 404, records all bounce parameters from the audio production and editing program 404, and identifies the current cycle range.

After the scan and checks performed by the scanner 312 are completed, the automated bouncing module 314 controls the audio production and editing program 404 by sending bounce commands 158 to bounce multiple jobs (mixes and/or sets of stems 160) with different cycle ranges, bounce parameters, etc. in a single run. The automated bouncing module 314 may include the capacity to automatically bounce wet and dry stems and/or mixes sequentially in a single pass without interruption. Further, the automated bouncing module 314 may be configured to bounce stems and mixes with or without various Master Out insert effects (gating, compressing, equalizing, reverb effects, etc.) applied at the Master Out bus. The automated bouncing module 314 creates custom and dynamic naming conventions for each stem and/or mix that is created during the bouncing process, as described above with respect to FIGS. 1 and 4-20. The automated bouncing module 314 displays a main window (FIG. 10) in the user interface of the DAW 400, through which various jobs and properties may be set for auto-bouncing operations. The features described with respect to the automated bouncing module 114 are also applicable to the automated bouncing module 314 and thus are not repeated. The companion application 300 saves time and frustration that would be involved in manual bouncing with the basic audio production and editing program 404 of the DAW 400.

The DAW 400 further includes at least one storage medium 408 for saving the stems, multi-tracks, and/or mixes 160 created from the automated bouncing process conducted by the automated bouncing module 314. The storage medium 408 may also store job set files (including job bounce locations) and bounce performance statistics. The storage medium 408 is a non-transitory computer readable storage medium. In some embodiments, the stems, multi-tracks, and/or mixes 160 created by the audio production and editing program 404 under the control of the automated bouncing module 314 during the auto-bouncing process may be stored in the storage medium 408. In particular, the automated bouncing module 314 may transmit the stems, multi-tracks, and/or mixes to the storage medium 408. Alternatively, the stems, multi-tracks, and/or mixes may be saved in the storage medium directly from the audio production and editing program 404. The storage medium 408 may also be configured to save the user inputs and commands received by the input module 310 The storage medium 408 is a non-transitory computer readable storage medium, such as (e.g., read only memory (ROM), random access memory (RAM), a hard disk drive, a compact disc (CD), a digital video disc (DVD), external cloud storage, server, or any other type of memory). The storage medium 408 is also used by the audio production and editing program 404 to save song/audio project files and data (e.g., Logic Pro project).

In some embodiments, the companion application 300 (Auto-Bounce) requires that both the audio production and editing program 404 (e.g., Logic Pro) and Auto-Bounce are always visible. This means that other applications should not be running concurrently while Auto-Bounce and Logic Pro are running.

The present teachings also provide for a computer program product comprising a non-transitory computer readable storage medium and a computer program stored thereon, wherein the computer program includes program code for processing audio data, as well as the scanner 312 and the automated bouncing module 314 built into the program code. When the program code with the scanner 312 and automated bouncing module 314 is executed by a processor of a digital audio workstation, the program code causes the digital audio workstation to perform automated bouncing of a plurality of jobs consecutively in a single run without need for user input in between each job. Each job specifies bouncing at least one stem, multi-track, and/or mix from multiple tracks of an audio project. In some embodiments, at least a portion of the jobs specify different cycle ranges. In some embodiments, at least a portion of the jobs specify different bounce parameters.

While the present teachings have been described above in terms of specific embodiments, it is to be understood that they are not limited to those disclosed embodiments. Many modifications and other embodiments will come to mind to those skilled in the art to which this pertains, and which are intended to be and are covered by both this disclosure and the appended claims. For example, in some instances, one or more features disclosed in connection with one embodiment can be used alone or in combination with one or more features of one or more other embodiments. It is intended that the scope of the present teachings should be determined by proper interpretation and construction of any claims and their legal equivalents, as understood by those of skill in the art relying upon the disclosure in this specification and the attached drawings.

What is claimed is:

1. An audio editing system comprising:

a controller for processing audio data;

an interface configured to establish communication between the controller and a digital audio workstation, the digital audio workstation having an audio production program executing thereon and at least one audio project stored therein;

a scanner controlled by the controller to determine whether the audio project is loaded in the audio production program of the digital audio workstation;

in response to a confirmation that the audio project is loaded, the scanner analyzes the audio project to obtain a list of all tracks corresponding to the audio project; and an automated bouncing module receiving a job list which includes multiple jobs, each job indicating a selection of said tracks and a cycle range to bounce into at least one set of stem files, at least one mix file, or at least one set of stem files and at least one mix file, wherein the automated bouncing module transmits bounce commands to the audio production program to automatically bounce the respective selection of said tracks for each job consecutively in a single run, and wherein the automated bouncing module automatically names each stem file and/or each mix file with distinct names according to a pre-defined naming convention.

2. The audio editing system of claim 1, wherein the scanner scans the audio project to obtain bounce settings of the digital audio workstation and mirror the bounce settings in the audio editing system.

3. The audio editing system of claim 2, wherein the controller is configured to modify the bounce setting in the audio editing system on a per-job basis.

4. The audio editing system of claim 2, wherein the bounce settings obtained from the digital audio workstation include the cycle range.

5. The audio editing system of claim 1, further comprising an editor that sets the pre-defined naming convention, wherein the editor provides a plurality of dynamic naming blocks each defining a naming convention, wherein a portion of the dynamic naming blocks are combined to form the pre-defined naming convention.

6. The audio editing system of claim 5, wherein each dynamic naming block automatically updates based on at least one of a plurality of factors, said factors including a project name, job name, track name, SMPTE time, sample rate, date, tempo, beats per minute (BPM), and a unique sequence number.

7. The audio editing system of claim 5, wherein the editor provides at least one custom naming block defined by a user, wherein the pre-defined naming convention includes the at least one custom naming block.

8. The audio editing system of claim 1, wherein the list of tracks obtained by the scanner includes tracks that are hidden and tracks that are turned off in the audio production program of the digital audio workstation.

9. The audio editing system of claim 1, wherein the automated bouncing module selectively mutes one or more auxiliary channels in the audio production program for at least one of the jobs to bounce a set of dry stems.

10. The audio editing system of claim 9, wherein the automated bouncing module is configured to bounce wet and dry stems and/or mixes sequentially.

11. The audio editing system of claim 1, wherein the automated bouncing module selectively turns off one or more FX inserts on a master out fader in the audio production program for at least one of the jobs to bounce an unmastered set of stems or an unmastered mix.

12. The audio editing system of claim 1, comprising a mix mode and at least three different stem modes, wherein each job is set to one of said modes;

wherein in the mix mode, every visible track or track stack that is selected for one of the jobs is mixed down into a single mix file; and wherein in the stem modes, every visible track or track stack that is selected for one of the jobs is exported as an individual stem file.

13. The audio editing system of claim 12, wherein the at least three different stem modes includes a static stem mode;

wherein in response to said one of the jobs being set to the static stem mode, all stems bounced for said one of the jobs have a common start point and a common end point.

14. The audio editing system of claim 12, wherein the at least three different stem modes includes a variable-end stem mode;

wherein in response to said one of the jobs being set to the variable-end stem mode, all stems bounced for said one of the jobs have a common start point, and each stem bounced for said one of the jobs has a variable end point defined by an end of the last region of the selected track or selected track stack in the cycle range.

15. The audio editing system of claim 12, wherein the at least three different stem modes includes a variable-start variable-end stem mode;

wherein in response to said one of the jobs being set to the variable-start variable-end stem mode, each stem bounced for said one of the jobs has a variable start point defined by a start of the first region of the selected track or selected track stack in the cycle range, and each stem bounced for said one of the jobs has a variable end point defined by an end of the last region of the selected track or selected track stack in the cycle range.

16. A non-transitory, computer-readable medium storing an audio editing companion application, the companion application comprising:

a link interface registering the companion application with an audio production program of a digital audio workstation, the link interface establishing a hook into the audio production program;

a scanner detecting an audio project which is loaded in the audio production program of the digital audio workstation, the scanner analyzing the audio project to obtain a list of all tracks corresponding to the audio project; and an automated bouncing module receiving a job list which includes multiple jobs, each job indicating a selection of said tracks and a cycle range to bounce into at least one set of stem files, at least one mix file, or at least one set of stem files and at least one mix file, wherein the automated bouncing module transmits bounce commands to the audio production program to automatically bounce the respective selection of said tracks for each job consecutively in a single run, and wherein the automated bouncing module automatically names each stem file and/or each mix file with distinct names according to a pre-defined naming convention;

wherein the audio editing companion application runs on the digital audio workstation.

17. The companion application of claim 16, wherein the multiples jobs have different cycle ranges.

18. The companion application of claim 16, wherein the scanner scans the audio project to obtain bounce settings in the audio production program and mirror the bounce settings in the companion application.

19. The companion application of claim 16, further comprising an editor that sets the pre-defined naming convention, wherein the editor provides a plurality of dynamic naming blocks each defining a naming convention and at least one custom naming block defined by a user, wherein a portion of the dynamic naming blocks and the custom naming block are combined to form the pre-defined naming convention;

wherein each dynamic naming block automatically updates based on at least one of a plurality of factors, said factors including a project name, job name, track name, SMPTE time, sample rate, date, tempo, beats per minute (BPM), and a unique sequence number.

20. The companion application of claim 16, wherein the bouncing module is configured to bounce wet and dry stems and/or mixes sequentially.

* * * * *